(12) United States Patent
Khalsa et al.

(10) Patent No.: US 8,790,119 B2
(45) Date of Patent: Jul. 29, 2014

(54) APPARATUS AND METHOD FOR TOOLS FOR MATHEMATICS INSTRUCTION

(75) Inventors: Arjan Khalsa, San Rafael, CA (US); Edward Murphy, Novato, CA (US)

(73) Assignee: Conceptua Math, Petaluma, CA (US)

( * ) Notice: Subject to any disclaimer, the term of this patent is extended or adjusted under 35 U.S.C. 154(b) by 228 days.

(21) Appl. No.: 12/960,337

(22) Filed: Dec. 3, 2010

(65) Prior Publication Data

US 2012/0141960 A1   Jun. 7, 2012

(51) Int. Cl.
*G09B 19/02*   (2006.01)
(52) U.S. Cl.
USPC .......................... 434/196; 434/191; 434/188
(58) Field of Classification Search
USPC .......................................... 434/188, 191, 196
See application file for complete search history.

(56) References Cited

U.S. PATENT DOCUMENTS

| | | | | |
|---|---|---|---|---|
| 2005/0034083 | A1* | 2/2005 | Jaeger | 715/863 |
| 2006/0062466 | A1 | 3/2006 | Zou et al. | |
| 2006/0078856 | A1* | 4/2006 | Kellman | 434/118 |
| 2007/0111172 | A1 | 5/2007 | Kinard | |
| 2008/0057480 | A1* | 3/2008 | Packard et al. | 434/188 |
| 2008/0254437 | A1* | 10/2008 | Heffernan et al. | 434/362 |
| 2009/0269727 | A1* | 10/2009 | Asplund et al. | 434/188 |
| 2011/0065082 | A1* | 3/2011 | Gal et al. | 434/365 |
| 2011/0111378 | A1* | 5/2011 | Nguyen | 434/204 |
| 2011/0250571 | A1* | 10/2011 | Weary et al. | 434/188 |

OTHER PUBLICATIONS

Lavender, Greg. "Extending Classes and Interfaces", University of Texas. Jun. 15, 1999. Retrieved from the internet. Retrieved Sep. 11, 2012 from <URL: http://www.cs.utexas.edu/~lavender/courses/tutorial/java-06.pdf>.*

Sundsted, Todd. "Observer and Observable", JavaWorld.com. Oct. 1, 1996. Retrieved from the internet. Retrieved Sep. 11, 2012 from <URL:   http://www.javaworld.com/jw-10-1996/jw-10-howto.html>.*

Ringo, Cathy. "EXCEL 2003: Professional Development for Microsoft Office 2003". Hillsoboro R-3 School District. May 30, 2006.*

Alley, Peter. Screenshots of "Microsoft Excel 2003". Generated Feb. 22 5pp.*

"Illuminations: Fraction Models". National Council of Teachers of Mathematics. Oct. 26, 2010. Retreived Jul. 12, 2013 from URL:<http://web.archive.org/web/20101026070355/http://illuminations.nctm.org/ActivityDetail.aspx?ID=11>.*

"Free Tools for Teachers", Conceptua Math, LLC, retrieved from url: http://web.archive.org/web/20101228112338/http://www.conceptuamath.com, Dec. 28, 2010.

* cited by examiner

*Primary Examiner* — Sam Yao
*Assistant Examiner* — Peter J Alley
(74) *Attorney, Agent, or Firm* — Michael A. Glenn; Perkins Coie LLP

(57) ABSTRACT

In a computer-implemented educational environment, four particular features are provided, which may be used separately or in combination, to drive the instruction of a particular curriculum, e.g. the instruction of fractions. In another implementation, educators and authors may use permutations and combinations of such features to construct in a graphical user interface a progression of interactive elements which help guide a student from visual concepts to procedures, such as equations and formulas. In a particular implementation, by using these features carefully, a curriculum author may design instructional sequences that provide careful, step-by-step sequences that help students progress from understanding the visual concepts, e.g. of fractions, to mastering procedures, e.g. fractions equations.

1 Claim, 33 Drawing Sheets

FIG. 7

FIG. 7 (Con't)

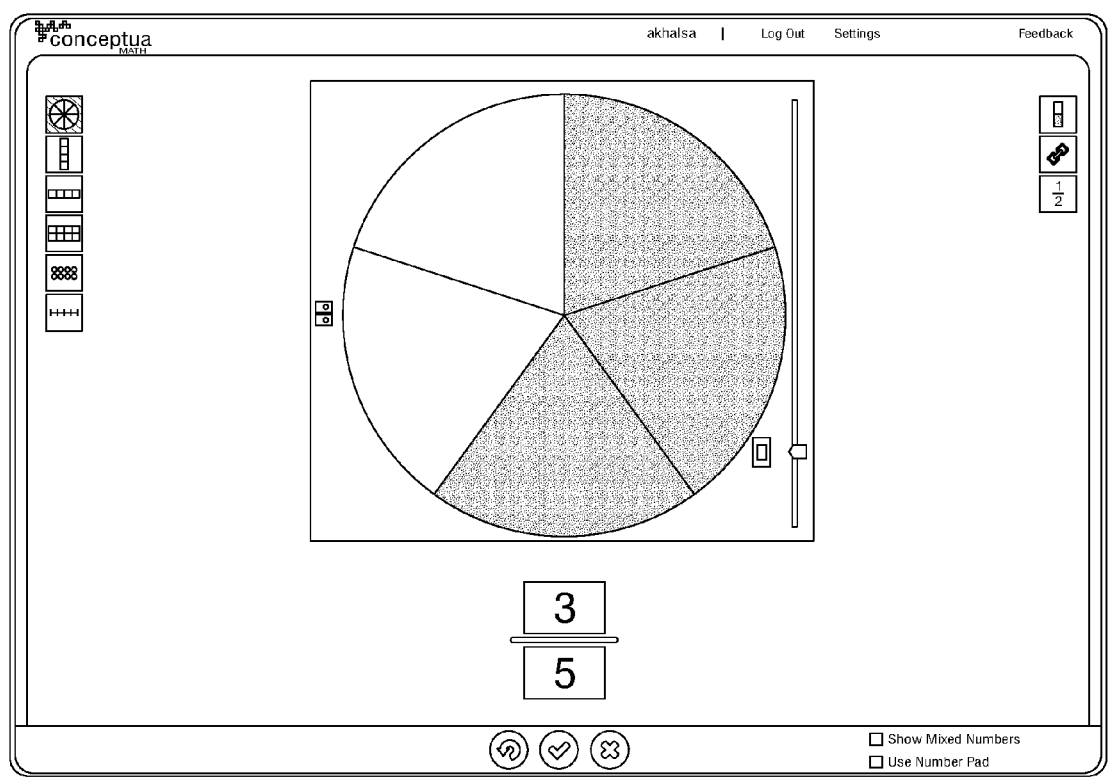
FIG. 9 (Con't)

Subtract the fractions.

$$\frac{8}{10} - \frac{4}{10} = $$

*Both the numerator and the denominator in the difference are unlocked. This is the final step in the sequence of visual concepts to procedures.*

☐ Use Number Pad

FIG. 26 enabled
theme     defaults
topic     TRUE
activity
preskillActivity
similarActivity
remedialActivity
numAssessmentPass
gotoPass
gotoFail Big Idea 4
Topic 2
Comparing Equations: Improper/Proper Fractions 424P 5
Comparing Equations: Improper/Proper Fractions 424M description     First use models to help you
number     learn strategies for comparing
mat     the sums and differences of two
useThreeFractions     examples that include improper
    fractions. Then you will do some
    without models.

compareMatAdvanced     int3     1     2
FALSE     commonDenominatorsMat     additionMat     additionMat
    TRUE     TRUE     TRUE

*FIG. 27A*

|  |  |  |  |  |
|---|---|---|---|---|
| prompt | Compare the sums. | In this activity you will work with improper fractions. You will use models to help you learn strategies for comparing the sums and differences of two examples. You will determine which answer is larger and drag the models to the correct box. Then you will do some without models. Click the arrow to go on. | These fractions have common denominators. Write the numerator to show the sum. | These fractions have common denominators. Write the numerator to show the sum. Is it larger or smaller than 6/4 plus 6/4? |
| smartText |  |  |  |  |
| helptext |  |  |  |  |
| checkHiddenNumber | FALSE |  |  |  |
| feedback |  |  |  |  |

*FIG. 27A (Con't)*

```
wholePartVisible                    FALSE
linked
    numberAndManipulative           FALSE                    FALSE    FALSE
    numberAndEquivalence            FALSE                    TRUE     TRUE
    manipulativeAndEquivalence      FALSE                    TRUE
    numberAndSentenceLinked         FALSE
    manipulativeAndSentenceLinked   FALSE
manipulatives
    allowed                         none
    default                         pie           vbar       vbar
    visible                         FALSE                    TRUE     TRUE
numbers
    visible                         TRUE                     TRUE     TRUE
equivalence
    visible                         TRUE                     TRUE
showFractionLabel
requireCommonDenominators           FALSE
isAssessment                        TRUE
Picture
noChecking                          FALSE
showProblemLabel
```

| fraction1 | | | | |
|---|---|---|---|---|
| label | | | | |
| manipulative | | | | |
|   numerator | | | | |
|     locked | FALSE | TRUE | TRUE | |
|     value | | 2 | 6 | |
|   denominator | | | | |
|     locked | FALSE | TRUE | TRUE | TRUE |
|     value | | 3 | 4 | 5 |
|   checkingMode | exact | | | |
| number | | | | |
|   wholePart | | | | |
|     value | 0 | | | |
|   fractionPart | | | | |
|     locked | | TRUE | TRUE | TRUE |
|     value | 0 | 2 | 6 | 6 |
|   denominator | | | | |
|     value | | TRUE | TRUE | TRUE |
|     locked | | | | |

FIG. 27B (Con't)

| 3 | 4 | 5 | 6 | 7 | 8 | 9 |
|---|---|---|---|---|---|---|
| commonDenominatorsMat | compareMatSimple | additionMat | additionMat | commonDenominatorsMat | compareMatSimple | additionMat |
|  |  | TRUE | TRUE |  |  | TRUE |
| Look at the sums. The numerators are the same, but the denominators are different. Look at the size of the parts in each whole. Click the arrow to go on and compare these sums. | The number of shaded parts is the same. Look at the size of the parts in each whole. Drag each fraction to the correct box. | These are like fractions. Write the numerator to show the sum. | These are like fractions. Write the numerator to show the sum. | Look at the sums. The denominators are the same, but the numerators are different. Compare the number of shaded parts. Click the arrow to go on and compare these sums. | The size of the shaded parts is the same. Look at the number of parts shaded. Drag each fraction to the correct box. | These are like fractions. Write the numerator to show the sum. |

*FIG. 27C*

|  |  |  |  |  |  |  |
|---|---|---|---|---|---|---|
| TRUE TRUE |  | TRUE | FALSE | TRUE TRUE TRUE | FALSE | FALSE TRUE |
| vbar |  |  |  |  |  |  |
|  | vbar | pie TRUE | vbar TRUE | vbar | pie TRUE | vbar TRUE |
|  | TRUE | TRUE | TRUE | TRUE TRUE TRUE | TRUE | TRUE |
| TRUE | TRUE | FALSE | TRUE | TRUE | FALSE | TRUE |
| TRUE |  | FALSE | TRUE | TRUE |  |  |
| TRUE FALSE |  |  |  | TRUE FALSE |  |  |
| 6/4 + 6/4 = |  |  |  | 6/10 + 6/10 = |  |  |
| TRUE 12 | TRUE 6 | TRUE 6 | TRUE 2 | TRUE 12 | TRUE 8 |  |
| TRUE 4 | TRUE 4 | TRUE 10 | TRUE 10 | TRUE 10 | TRUE 6 |  |
| TRUE 12 | TRUE 6 | TRUE 6 | TRUE 2 | TRUE 12 | TRUE 8 |  |
| TRUE | TRUE | TRUE | TRUE | TRUE | TRUE |  |

FIG. 27D

| | |
|---|---|
| ◁€ Shade parts to make an equivalent fraction.<br>◁€ More equal parts. More shaded parts.<br><br>(circle half-shaded) = (circle divided in quarters) | Problem from Topic 1<br>Concrete-representational<br>Model layer is shown<br>Equivalence and fractions layers are hidden |
| ◁€ Shade the parts and write the numerator for the equivalent fraction.<br>◁€Larger denominator. Larger numerator. Same shaded area.<br><br>$\frac{1}{2}$ = $\frac{\square}{4}$ | Problem from Topic 3<br>Transitioning from concrete-representational to abstract<br>Model and fractions layers are shown, equivalence layer is hidden. |
| ◁€ Write the equivalent fractions.<br><br>$\frac{1}{2} = \frac{1 \times 3}{2 \,\square\, 3} = \frac{1 \times 5}{2 \,\square\, 5}$ | Problem from Topic 4<br>Transitioning from concrete-representational to abstract<br>All three layers are shown |
| ◁€ Complete the equations to make equivalent fractions.<br><br>$\frac{3}{5} = \frac{3 \times \square}{5 \,\square} = \frac{3 \times \square}{5 \,\square}$<br>$= \frac{\square}{15} = \frac{\square}{20}$ | Problem from Topic 4<br>Abstract<br>Equivalence and fractions layers are shown, Models layer is hidden. |

*FIG. 29A*

APPARATUS AND METHOD FOR TOOLS FOR MATHEMATICS INSTRUCTION

BACKGROUND OF THE INVENTION

1. Technical Field

This invention relates generally to the field of computer-implemented educational tools in mathematics. More specifically, this invention relates to computer-implemented educational tools for facilitating the teaching of mathematics by employing inventive approaches and techniques that support the teacher-student collaboration desired for a student mastering an area of mathematics.

2. Description of the Related Art

Mathematics may be difficult to each and may be difficult for students to learn. Fractions, for example, have been found to be both difficult to teach and difficult for students to learn. At the same time, fractions, as well as other areas of mathematics, are a pivotal topic in mathematics education. Strategic use of technology can help support the teacher-student collaboration required to master this wide-ranging subject area.

An example: The challenges with fractions.

"*Learning about fractions in the upper elementary grades is hard. Really hard*! Fractions are hard not only for children to learn but for teachers to teach." This is how Marilyn Burns, the highly esteemed author on elementary mathematics education, begins her first of three extensive books on teaching fractions (Burns, 2001). The National Math Advisory Panel identified fractions as an area that requires special attention: "*Difficulty with fractions (including decimals and percents) is pervasive and is a major obstacle to further progress in mathematics, including algebra*" (National Math Advisory Panel, 2008, p. xix). This challenge is understandable. Fractions present major conceptual leaps for students.

Consider these factors:

Fractions can describe many different things. When Sarah drinks half of the water in the bottle, she is consuming part of a whole ($\frac{1}{2}$). When Jeremy eats three of nine carrot sticks, he is consuming part of a set ($\frac{3}{9}$ or $\frac{1}{3}$). When Justin reads for 15 minutes, that represents $\frac{1}{4}$ of a common unit of time. When Hannah swims across the lake her feat is a measure of length (e.g., $1\frac{1}{3}$ miles). And on it goes, from one quarter of a dollar, to $\frac{1}{3}$ cup of flour, to $\frac{1}{2}$ of an acre of land. Fractions represent so many different things!

Sophisticated reasoning is required to evaluate any fraction. Upon entering the topic of fractions, students must analyze the relationship between two numbers in order to understand a single value. For example, $\frac{1}{8}$ is smaller than $\frac{1}{4}$, and $\frac{3}{8}$ is larger than $\frac{1}{4}$.

The real value of fractions is dependent upon the unit, or whole, of which they are a part. $\frac{3}{4}$ is not always greater than $\frac{1}{4}$! $\frac{3}{4}$ of a county is a smaller region than $\frac{1}{4}$ of a continent.

Fractions present a plethora of new terms for students to master: numerator, denominator, equivalent, common, uncommon, proper, improper, and more.

Students must first learn what fractions mean, and then they must perform operations on these fractions. Some of these operations, like addition and subtraction with uncommon denominators, require multiple steps. Other operations, like multiplying and dividing fractions, seem very abstract to many people, and disconnected from anything in real life. (Can you find a real life example of $\frac{1}{8} \div \frac{1}{3}$? It is possible, but certainly not trivial!)

It would be advantageous to provide computer-implemented educational tools that address and target the particular challenges for both the student and teacher about the teaching of and the learning of particular areas of mathematics, e.g. fractions, as described hereinabove.

SUMMARY OF THE INVENTION

In a computer-implemented educational environment, four particular features are provided, which may be used separately or in combination, to drive the instruction of a particular curriculum, e.g. the instruction of fractions. In another implementation, educators and authors may use permutations and combinations of such features to construct in a graphical user interface a progression of interactive elements which help guide a student from visual concepts to procedures, such as equations and formulas. In a particular implementation, by using these features carefully, a curriculum author may design instructional sequences that provide careful, step-by-step sequences that help students progress from understanding the visual concepts, e.g. of fractions, to mastering procedures, e.g. fractions equations.

BRIEF DESCRIPTION OF THE DRAWINGS

Figure 7:
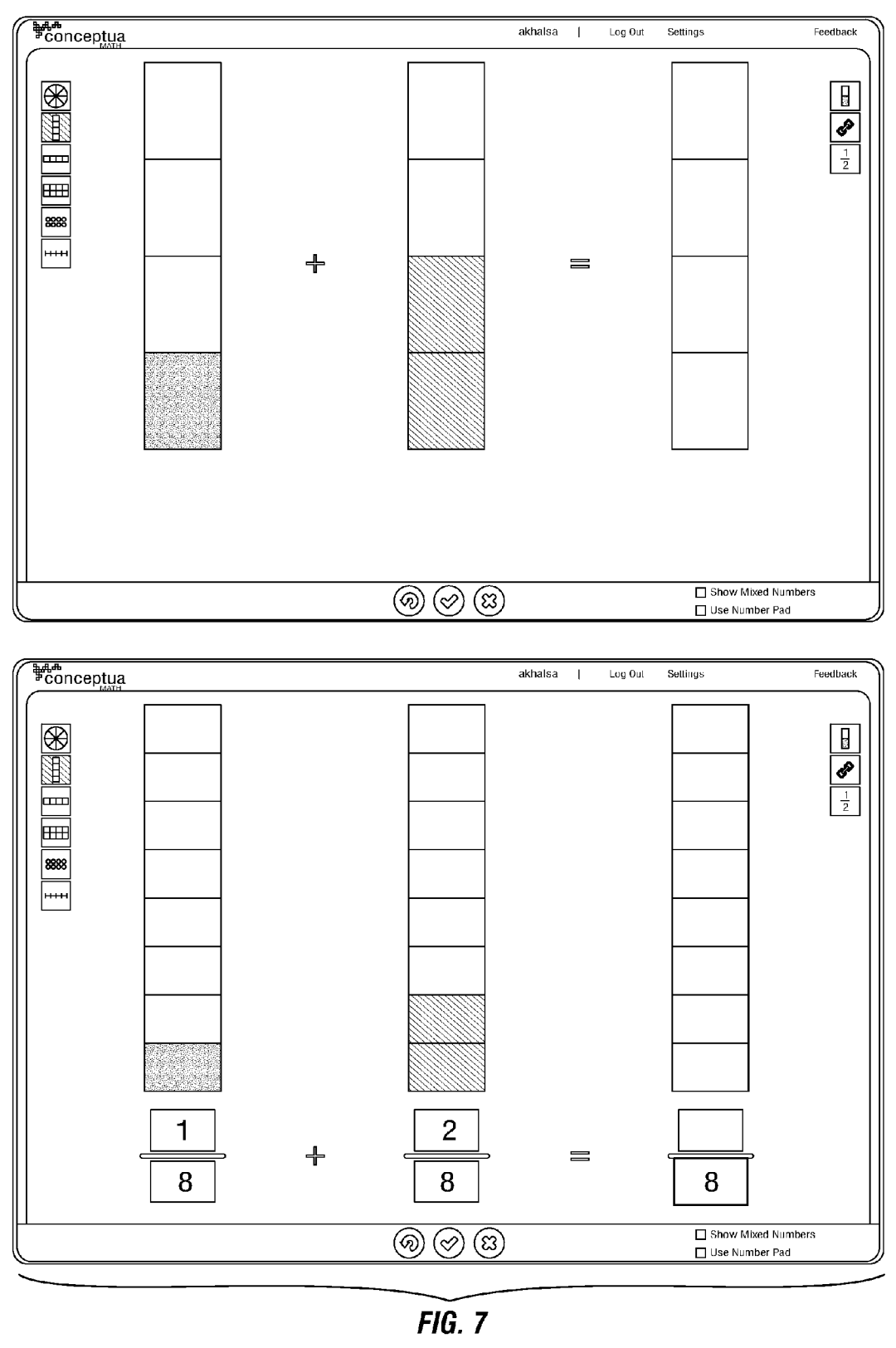

FIG. 7 shows three example screen shots showing models only, models and fractions only, and fractions only, respectively, according to an embodiment;

FIG. 10 shows example screen shots of a problem where a student is adding fractions with common denominators and the linked option has been employed, according to an embodiment;

FIG. 14 shows two screen shots for adding fractions including changing the denominator in the model layer, according to an embodiment;

FIG. 26 is an example screen shot showing only the fractions layer where both the numerator and the denominator in the difference are unlocked, a final step in a sequence of visual concepts to procedures, according to an embodiment;

FIG. 27 is a part of a sample worksheet of a sample spreadsheet, according to an embodiment;

DETAILED DESCRIPTION OF THE INVENTION

Figure 1:
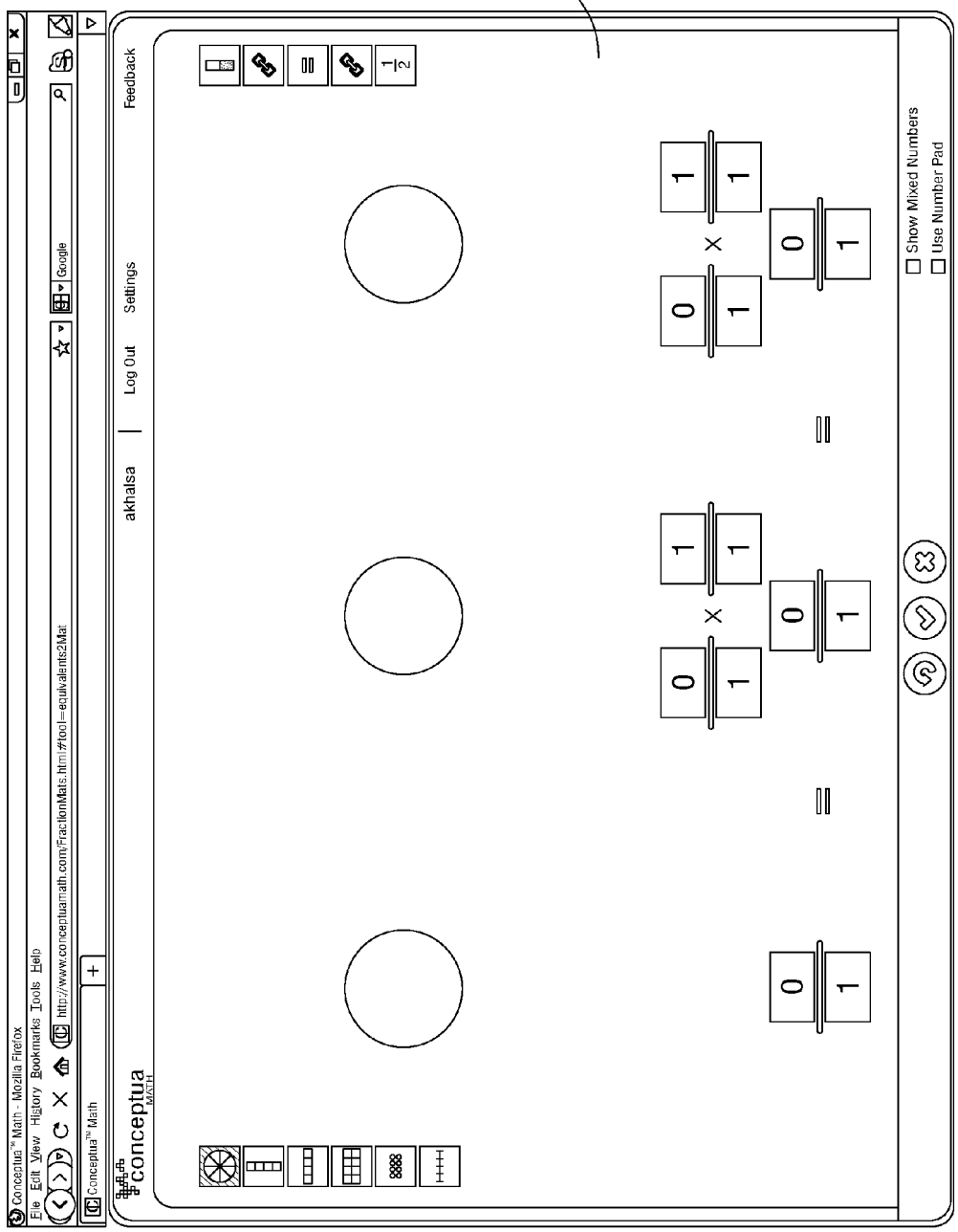
FIG. 1 is an example screen shot of models, equivalence, and fraction layers in tool mode, according to an embodiment.

In a computer-implemented educational environment, four particular features are provided, which may be used separately or in combination, to drive the instruction of a particular curriculum, e.g. the instruction of fractions. In another implementation, educators and authors may use permutations and combinations of such features to construct in a graphical user interface a progression of interactive elements which help guide a student from visual concepts to procedures, such as equations and formulas. In a particular implementation, by using these features carefully, a curriculum author may design instructional sequences that provide careful, step-by-step sequences that help students progress from understanding the visual concepts, e.g. of fractions, to mastering procedures, e.g. fractions equations.

While much of the discussion herein is about a particular area of mathematics, namely, fractions, it should be appreciated that using fractions as a particular subject area of mathematics is to aid in the understanding of the invention only and is not meant to be limiting. Put another way, one skilled in the art would readily recognize that the particular details about fractions could be replaced by details of other areas of mathematics and not stray from the scope and spirit of the invention.

INTRODUCTION

Features, Tools, and Modes

Four (4) Features.

An embodiment of a computer-implemented fractions methodology ("the computer-implemented methodology" or "system") is provided. Such methodology provides four primary feature sets that power conceptual fractions tools. The four features provided by the methodology is as follows:
    Hide and Show
    Link and Unlink
    Lock and Unlock
    Multiple Models These four features can be used separately or in combination to drive the instruction provided by the computer-implemented methodology. By using these features carefully, a curriculum author can design instructional sequences that provide careful, step-by-step sequences that help students progress from understanding the visual concepts of fractions to mastering fractions equations. With the computer-implemented methodology, educators and authors use these permutations and combinations to construct a progression from visual concepts to procedures (equations, formulas). This is an educational core of the computer-implemented methodology. These four features are discussed in more details hereinbelow in this document.

Fifteen (15) Tools.

In an embodiment, technical, instructional capabilities of the computer-implemented methodology are built into fifteen tools. Each tool is an application designed to teach a specific fractions topic. The tools are in two categories: Concepts to Procedures and Higher Order Thinking. The Concepts to Procedures tools make extensive use of the four primary feature sets. The Higher Order Thinking tools each employ at least one of the feature sets, but do not involve the same level of feature integration as they do not emphasize the progress from concepts to procedures.

Concepts to Procedures Tools
    Identifying Fractions
    Comparing Fractions
    Adding Fractions with Common Denominators
    Subtracting Fractions with Common Denominators
    Equivalent Fractions
    Equivalent Fractions with Word Sentences
    Finding Common Denominators
    Adding Fractions with Uncommon Denominators
    Subtracting Fractions with Uncommon Denominators
    (Multiplying Fractions—not yet developed)
    (Dividing Fractions—not yet developed)
Higher Order Thinking Tools
    Order Fractions on a Number Line
    Unitizing with Pattern Blocks
    Unitizing Fractions on a Grid
    Estimating with benchmark Fractions It should be appreciated that the procedure tool, Comparing Fractions, is a tool in this set that does not employ Hide and Show, Link and Unlink, or Lock and Unlock. However, it does employ a special case version of lock and unlock. For example, in the Comparing Fractions tool, the user is given the opportunity to place their own fractions onto the screen, and compare them to determine which is smaller and which is larger. The user may compare either two or three fractions. The user enters a numerator and denominator in each of two or three blank fractions. When the user is satisfied with the fractions they have entered, they lock these fractions, e.g. by using the icon displayed in FIG. 15. Once this locking action has been accomplished, the user may display the fractions in the form of various models and may place the fractions in the "bins" that are used for comparison purposes. In this instance, the user does not have an "unlock" option. The fractions start in the unlocked state. Once the user locks them, the user may employ them and compare them, but the user cannot unlock them and re-state their value. In order to compare a new set of fractions, the user resets the tool, effectively completing their session with one set of fractions, and is then given two or three unlocked fractions. These unlocked fractions are ready to be populated, locked, and compared.

Three (3) Modes.

In an embodiment, the four features are employed in three different modes of interactions: Tool Mode, Activity Mode, and Authoring Mode. Each of these modes employs the tools referenced above.

Tool Mode

Figure 2:
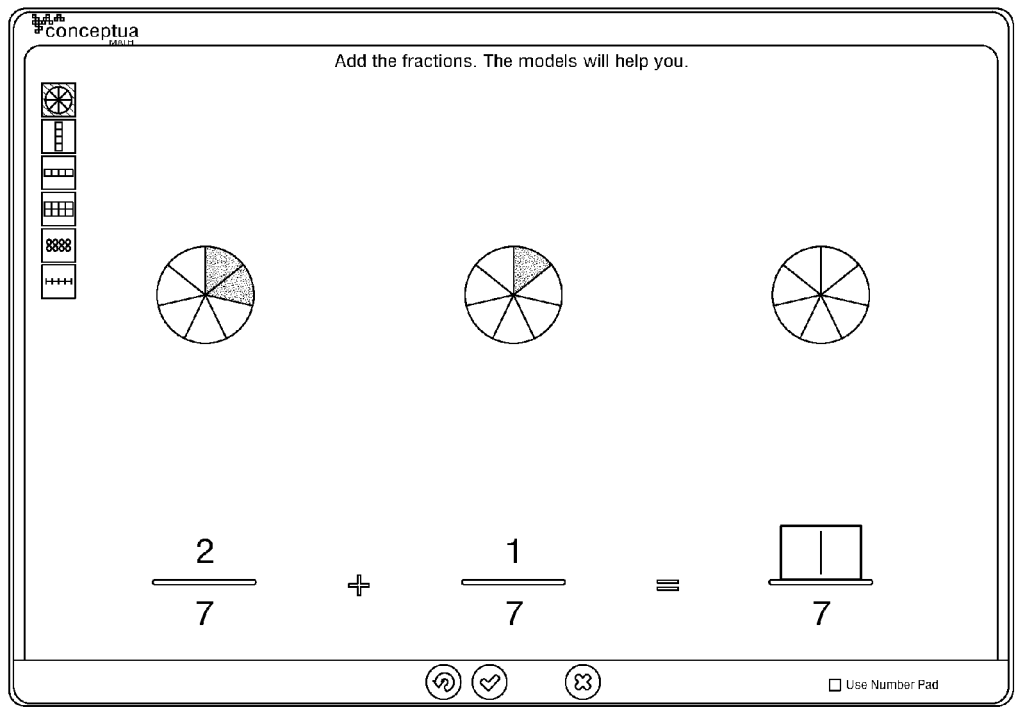
FIG. 2 is an example screen shot for adding fractions, according to an embodiment.
Figure 3:
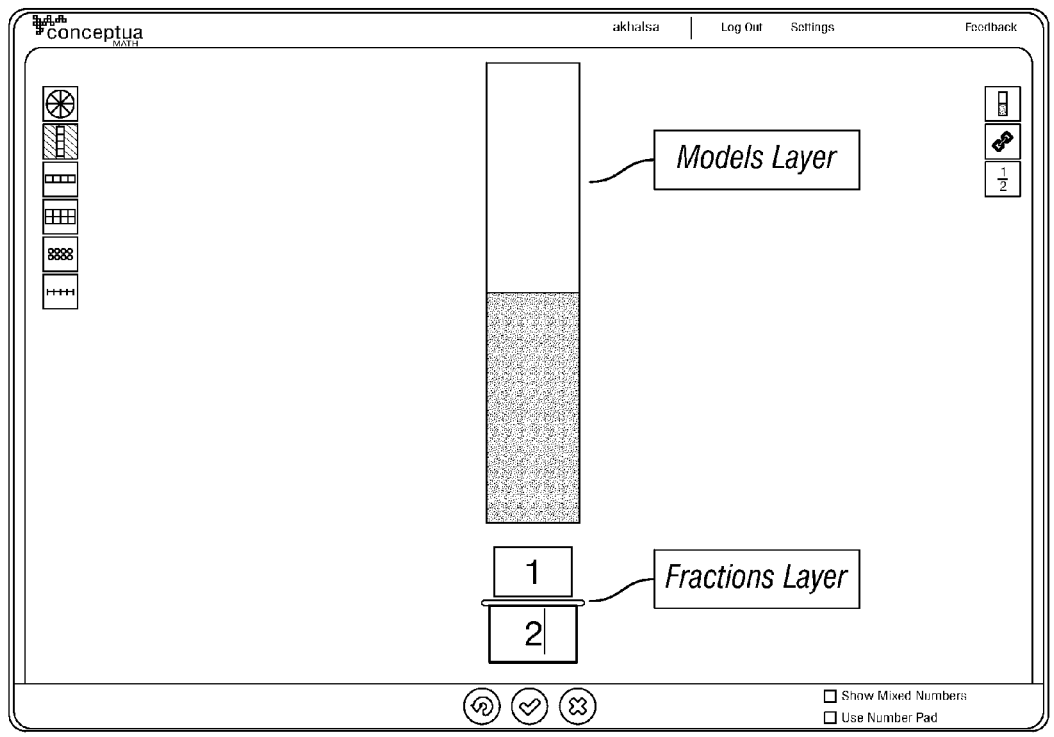
FIG. 3 is an example screen shot showing a linked model layer and fractions layer, according to an embodiment.
Figure 4:
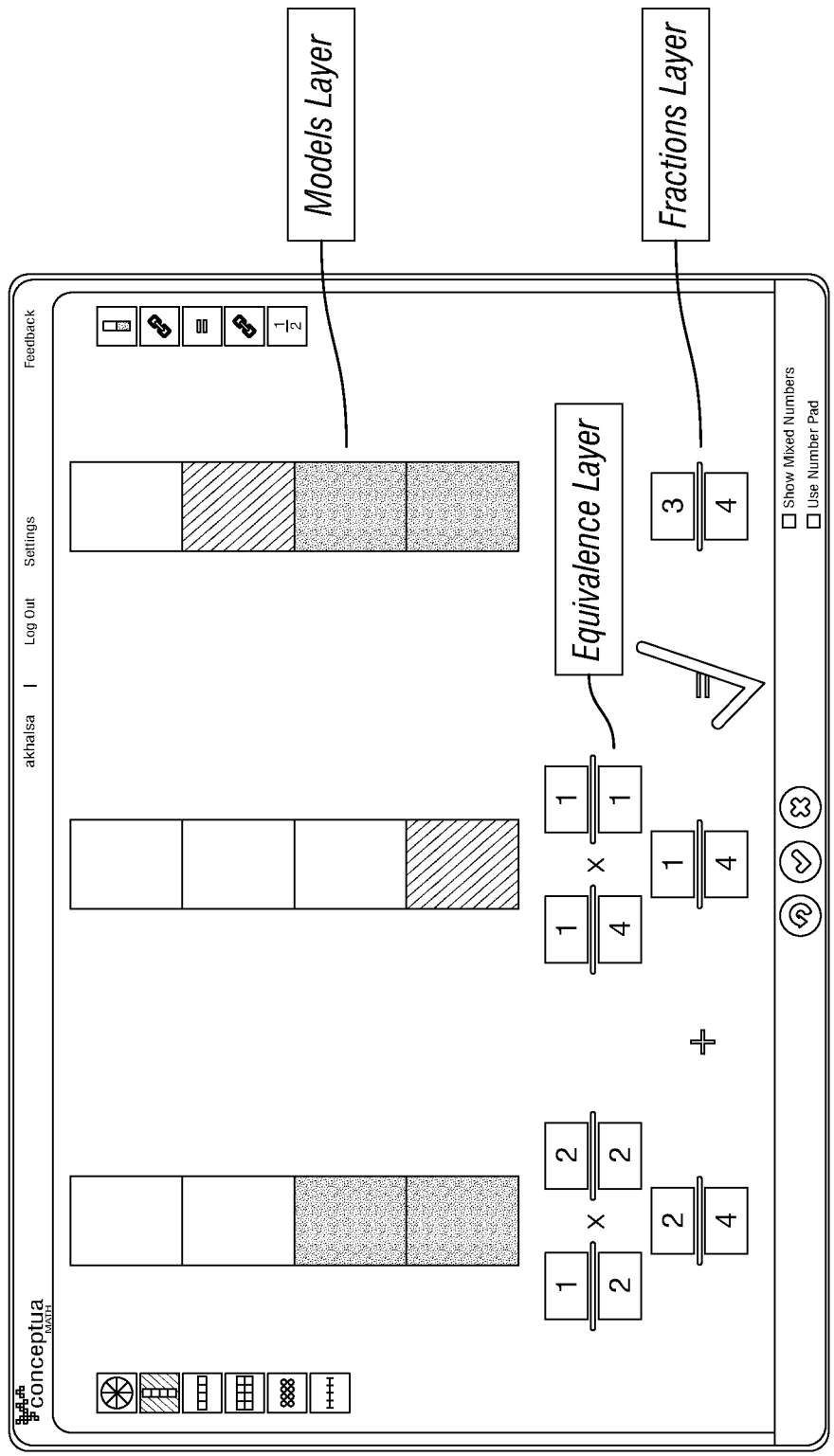
FIG. 4 is an example screen showing an model layer, equivalence layer, and feedback in the fractions layer, according to an embodiment.

Tool mode involves using the computer-implemented methodology in a most native mode. For example, in an embodiment, such tools may include the features that are free of actual numeric content. Tool Mode is intended for use by a teacher in whole class instruction. The teacher may select his or her own problem to investigate with the students, enter the problem into the tool, and then lead a discussion that involves the progression from visual models to procedures. Tool Mode is also for students who are investigating a problem, or type of problem, and benefit from an open-ended environment with a choice of fractions models and visual representations. FIG. 1 shows an example of an embodiment of the Tool Mode for an equivalent fractions investigation. FIGS. 2-4 were all created in Tool Mode, and numbers were entered to populate each screen. That is, FIG. 2 is an example screen shot for adding fractions, according to an embodiment. FIG. 3 is an example screen shot showing a linked model layer and fractions layer, according to an embodiment. And, FIG. 4 is an example screen showing a model layer, equivalence layer, and feedback in the fractions layer, according to an embodiment.

Activity Mode

In an embodiment, an Activity mode is provided that may involve using student activities, or units, that are pre-authored. For example, authored activities may be provided and sold as a premium subscription. Activities are comprised of a set of one or more problems arranged in a sequence. Each problem within each activity set uses a distinct tool, such as Identifying Fractions or Adding Fractions with Common Denominators.

In an embodiment, activities created for this mode are authored using a spreadsheet. An authoring spreadsheet is the document that contains the information, or data, that defines one or more Activities, and the Problems within each activity. Activities consist of a set of problems, usually between 20 and 30, that a child is expected to explore and answer in a given session, e.g. of about five to 15 minutes. Each activity culminates in a six-problem Skills Check, during which data is collected.

Each worksheet within a spreadsheet defines an activity or set of problems. An embodiment of such spreadsheet using such type of worksheet can be understood with reference to FIG. 27. FIG. 27 is a part of a sample worksheet of a sample spreadsheet, according to an embodiment. FIG. 27 contains four subparts, FIGS. 27*a*-27*d*, each of which show parts of a worksheet according to an embodiment, as follows. FIG. 27*a* shows rows 1-21 and columns A-J of this particular spreadsheet. FIG. 27*b* shows rows 22-51 as well as columns A-J; FIG. 27*c* shows rows 1-21 and columns K-Q; and FIG. 27*d* shows rows 22-51 and columns K-Q. Such rows 1-51 and columns A-Q are for illustrative purposes only and are not limiting. The rest of the rows and the rest of the columns of the particular spreadsheet are not shown.

The columns of the worksheet defined each individual problem. There is one column for each problem. The rows of the spreadsheet define the variables for each problem. Some of these variables are used in a number of tools and some variables are specific to one kind of tool. For instance, variables used in a number of tools include: the name of the problem (a unique identifier), the tool upon which the problem is based, the text presented at the top of the screen (instructions for the student), whether the problem is a skills check problem, the elements that are visible on the screen (models, fractions, anything that will appear on the screen), the values of every fraction in the problem (whether represented as a model or number), and which values are locked or unlocked, which values are linked or unlinked, the specific visual models (if any) that are employed in the screen, and the answer field(s) that the student must populate in order to complete the problem. An example of variables that are specific to a single tool are the variables that define the tessellation pattern in the Unitizing with Pattern Blocks tool. In an embodiment, there are approximately 100 variables per problem, with the amount dependent upon the tool that is being employed.

In an embodiment, the spreadsheet may contain information on the Activity level as well, as opposed to the problem level. This information may include the name of the activity and such information identifies the activities to which the student will progress in the case when the student passes or fails the Skills Check.

Thus, as can be gleaned from the above, in an embodiment, the spreadsheet may identify technical variables for each problem, including the numbers (fractions) employed, models used, and the use of hide and show, link and unlink, lock and unlock, and other specifications for a given problem. These variables set the presentation of the tool for a specific problem, so that the tool does not appear agnostic and content-free, as it does in tool mode. Rather, it appears populated and dedicated to a very specific task, and that task is denoted as a problem for a student to solve. In this regard, problem authoring is accomplished using a spreadsheet to assign the values of the four features to a given tool. Problems are aggregated together into activities or activity sets. Activities are presented in Activity Mode.

Figure 31:
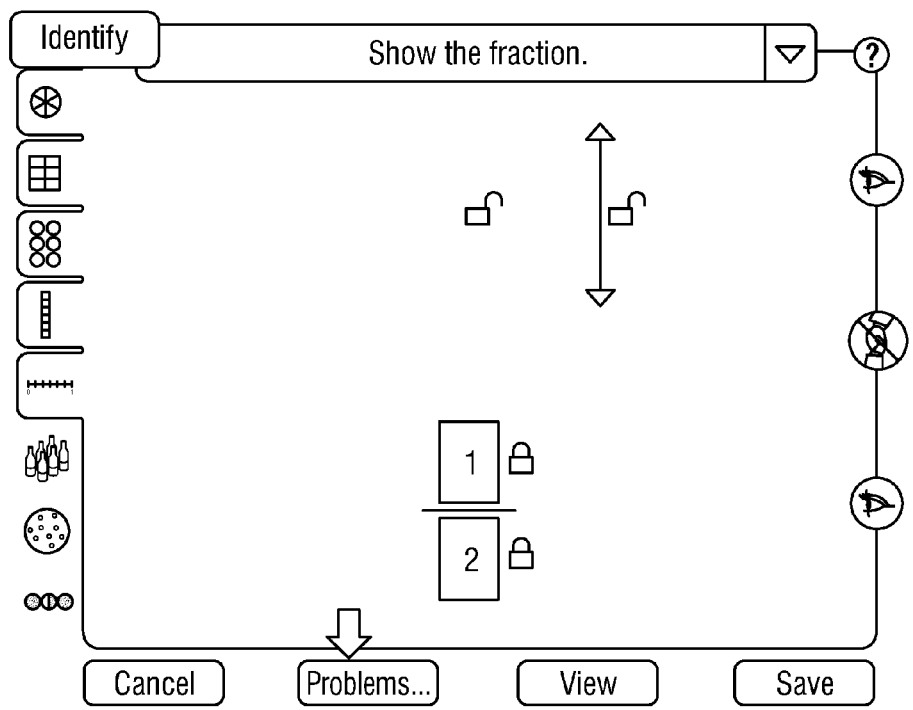
FIG. 31 is an example screen showing WYSIWIG authoring, according to an embodiment.

In another embodiment, problems created for Activity mode are authored using a GUI interface that implements a What-You-See-Is-What-You-Get (WYSIWYG) editing environment where the author can specify values for the technical variables for each problem, including the numbers (fractions) employed, models used, and the use of hide and show, link and unlink, lock and unlock, and other specifications for a given problem, by setting the state of GUI controls, such as buttons, sliders, text editing boxes, sliders, scrollbars and the like. The state of the GUI controls are reflected in the technical variables that comprise the problem data. For instance, by selecting the icon located next to the numerator editing box and making it appear locked, the author can specify that the numerator cannot be changed in activity mode. FIG. 31 shows an example screen shot of WYSIWYG authoring, according to an embodiment.

Authoring Mode

An embodiment provides an authoring mode that may employ the fifteen tools described above, with authoring, saving, and sharing capabilities built-in. With the embodiment, a teacher may be able to accomplish some authoring tasks for Activity Mode without using a spreadsheet. In authoring mode, the user is presented with on-screen icons to set variables for each object that can be controlled. For the purposes of the discussion herein, an icon means any graphical user interface (GUI) control that the user interacts with to set, clear or change a value in the software. Some examples of GUI controls are a graphic image, a button, a radio button, a check box, a list control, a scrollbar, a slider or the like. This list is not exhaustive and is not meant to be limiting and is meant to illustrate that there are a wide range of possible GUI controls. An embodiment provides, but is not limited to, the following capabilities:

- Icons that are present in Tool mode may be included. These include icons for multiple models, link and unlink, and hide and show.
- Additional icons may be provided for lock and unlock. In an embodiment, there may be one icon for each editable element. This means that there may be a lock and unlock option for the numerator and denominator of any fraction or model displayed on the screen.
- There are icons that allow a user to mask the presence of any given manipulative model, so that students cannot see or employ the model in the given screen.
- There is an ability to SAVE the authored page. The saved page may include the settings of each model, such as hide/show/link/unlink, and lock/unlock decision made by the author. The save operation may also include any numbers that have been placed on the screen, whether locked or unlocked.
- There is the ability to OPEN a SAVED document. This means that after an author has created a saved problem to his/her specifications, that author, or another user, may open the item to experience the benefits of, e.g. to use, the authored problem.
- An embodiment may provide a What-You-See-Is-What-You-Get (WYSIWIG) editor for problem variables, such as that illustrated in FIG. 31.

Thus, for example, in an embodiment, a teacher is able to create and save problems that employ hide and show, link and unlink, lock and unlock, and multiple models. These functionalities allow a teacher to use the Tools to create his or her own problems, save those problems, assign them to students, and share them with colleagues.

Benefits of the Features, Tools, and Modes

The Ability to Scaffold Instruction.

An embodiment provides the ability to scaffold instruction. It should be appreciated that in an embodiment, many of the provided tools offer up to 13,000 combinations of the variables dictated by the feature sets.

For example, the tool called Adding Fractions with Common Denominators may be analyzed in order to elucidate these combinations. The tool may include the following elements on the screen: six manipulative models and three fractions, each with a separate field for the numerator and denominator. An author may choose to employ these elements in a variety of ways in order to accomplish specific educational objectives. Hereinbelow in no particular order are some examples of how a problem, such as $2/3+3/8$, may be presented:

a) Show the problem with locked models in the addends, models only, no numbers using one specific model, not allowing the student to choose their own, different model. In the answer field, divide the sum into the appropriate number of equal parts (8), and ask the student to shade the requisite number of equal parts in order to represent the answer (5), (6 possible renderings, given the different models)

b) Show the problem exactly as described in (a), except do not include the pre-determined division into 8 equal parts. Instead, ask the student to make their own partitions and to shade the appropriate number ($5/8$). (6 possible renderings, given the different models)

c) Show the problem exactly as described in (a) above, except give the student the option to display specified alternative models. The author has one model set as the default, and the student may choose either one other model, two other models, or whatever set of the five other models the author has selected. (60 possible renderings)

d) Show the problem exactly as described in (a) above, except unlock the numerators of the addends, forcing the student to shade their own addends in each model. Require the student to represent the problem, $2/8+3/8$. (6 possible renderings, given the different models)

e) Show the problem exactly as described in (d) above, except unlock the numerator of one of the addends, forcing the student to shade the addends in one model. Require the student to represent the problem, $2/8+3/8$. (12 possible renderings, given the different models, and the choice to have the student shade one or the other numerator)

The permutations and combinations above describe 90 different possible representations of the same problem. Many more representations are possible as the screen is evolved to display models and numbers together, and numbers only. When a given problem includes more than one layer (the layers in this instance being models and numbers), then there exists the possibility to Link or Unlink these layers. Link/Unlink may increase the number of variables substantially.

Each combination potentially offers a unique level of scaffolding to drive student instruction. For the purposes of the discussion herein, scaffolding instruction is a term that describes the careful sequence of steps that may be taken to help a student learn a topic. For example, the problems are may be designed to be instructional. Thus, the purpose for a problem set is to provide the student with a sequence of interactions that leads the student down a particular pedagogical path. One problem builds from the prior problem to help the student gain greater insight into the fractions topic. Much like a scaffold on the side of a building helps painters work at higher and higher floors, carefully scaffolded instruction helps students understand sequentially more advanced mathematical topics. Thus, as shown hereinabove and according to an embodiment, authors may use the spreadsheets and teachers may use the Tools to build such scaffolds and lead students to higher understanding.

In an embodiment, a broadly accepted tenant in scaffolded instruction is progressing from concrete-representational (or pictorial) to abstract (numbers). Much research has been conducted that points to the value of this progression. It has been found that students learn better when they learn mathematics first with hands-on manipulatives (such as blocks), then pictures of those manipulatives (such as the models in the system discussed herein), and finally numbers. This sequence may be referred to as concrete, to concrete representational, to abstract.

Figure 28A:
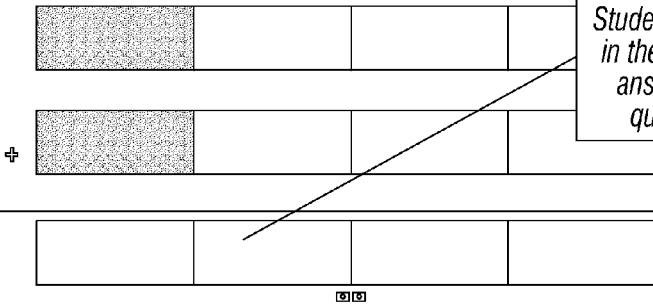
FIG. 28 is a table containing screens of an example where each screen represents like problems on each floor of the scaffolding, according to an embodiment.
Figure 28B:
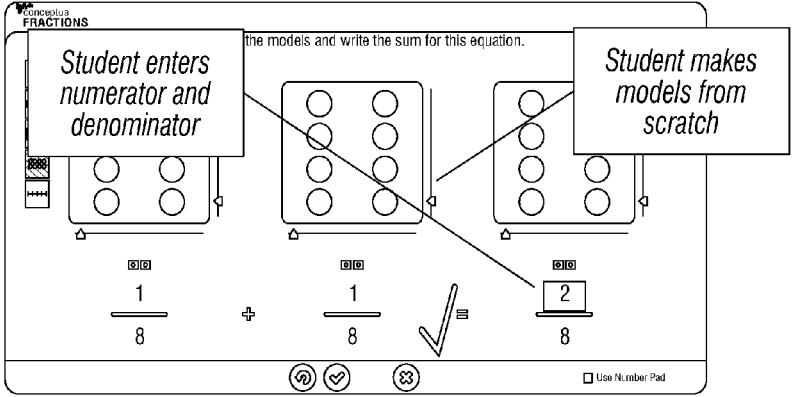

Scaffolding, according to an embodiment, can be understood with reference to FIG. 28. FIG. 28 is a table containing screens of an example where each screen represents like problems on each floor of the scaffolding, according to an embodiment. The example in FIG. 28 demonstrates scaffolding in one problem set that is included in an embodiment. In the example, the topic is Adding Unit Fractions. A "unit" fraction has the number "1" in the numerator. The screens displayed are extracted from a set of 30 problems. Each screen represents six like problems. In other words, there are six problems on each "floor" of the "scaffolding."

Thus, using the Adding Fractions with Common Denominators Tool, a teacher may render each of the problems in real time. This scaffolding may be presented live (real-time) in tool mode, designed into the problems included in activity mode, or saved by teachers in authoring mode.

Progressing from Visual Concepts to Procedures.

The four features, added together, provide a unique environment to present lessons that are organized to guide students from understanding visual models to understanding numeric procedures.

Correlating with Different Curricula.

Given the great flexibility built into the computer-implemented methodology, it is possible to adapt particular representations of the computer-implemented methodology to match published mathematics curricula.

Useful in Many Different Classroom Settings.

Flexibility makes the computer-implemented methodology applicable and useful in many modes of instruction; teacher-led whole class instruction, computer labs, one on one instruction, independent student practice (including at home) and intervention environments.

Answer Checking and Corrective Feedback.

An embodiment provides a unique capability of checking the accuracy of student responses and providing corrective feedback. It should be appreciated that an embodiment provides such capability for problems rendered in tool mode and activity mode. Because the computer-implemented methodology is aware of the complex relationships between the many features on the screen, it provides responses and feedback that are customized around the student's individual work.

The Four Features

Figure 5:
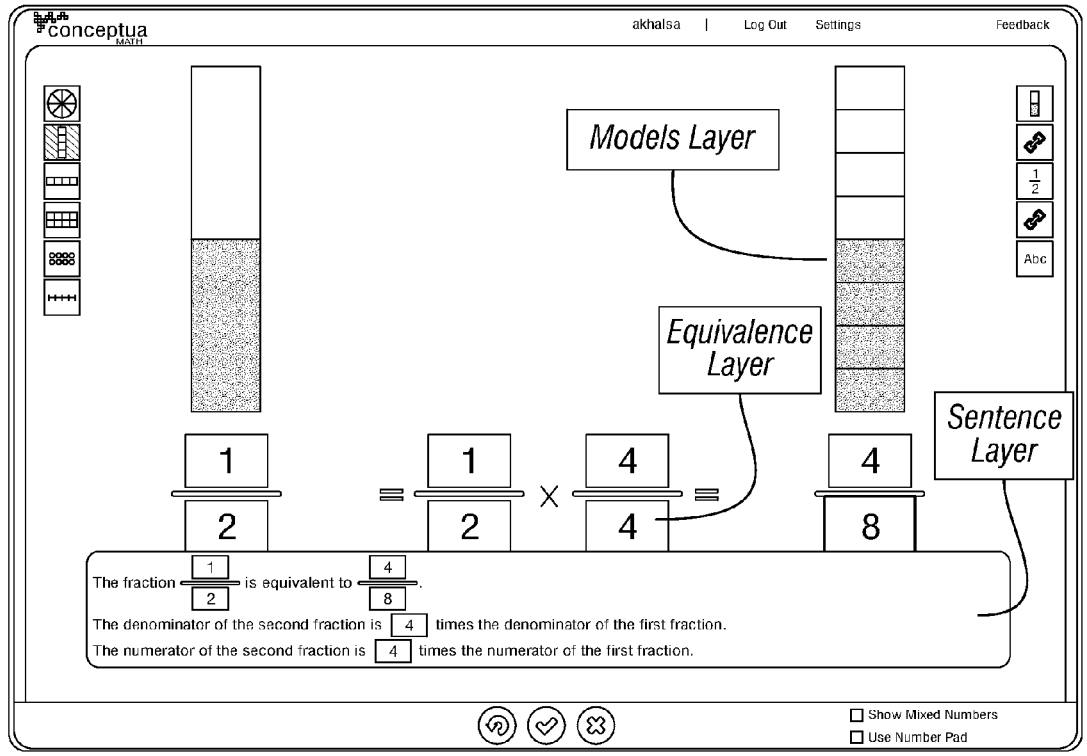
FIG. 5 is an example screen shot showing a model layer, equivalence layer, and a sentence layer, according to an embodiment.

Feature #1: Hide and Show
Purpose:

In order to accomplish the goal of revealing one, two, three or four of the layers discussed above, the computer-implemented methodology provides a Hide and Show feature. In a particular educational approach to teaching fractions, it is desirable for teachers and students to appreciate the relationships between pictorial models and numeric equations, i.e. or procedures. An embodiment provides either two or three elements to hide or show, depending upon the fractions topic. Such elements are referred to herein as layers. Earlier topics in the learning process may contain two layers, the models layer and the fractions layer as shown for example in FIG. 2. More advanced topics may include a layer that is devoted to equivalence; this equivalence layer offers a third option for these topics, as shown for example in FIG. 4. One specific topic, equivalent fractions with sentences, includes a sentence layer. In this instance, the emphasis of the progress is from visual models to sentences, instead of visual models to procedures. FIG. 5 depicts an example screen shot showing a sentence layer. An embodiment contemplates similar tools for multiplying and dividing fractions, which are not shown. An embodiment contemplates employing the sentence layer for such tools for multiplying and dividing fractions.

Figure 6:
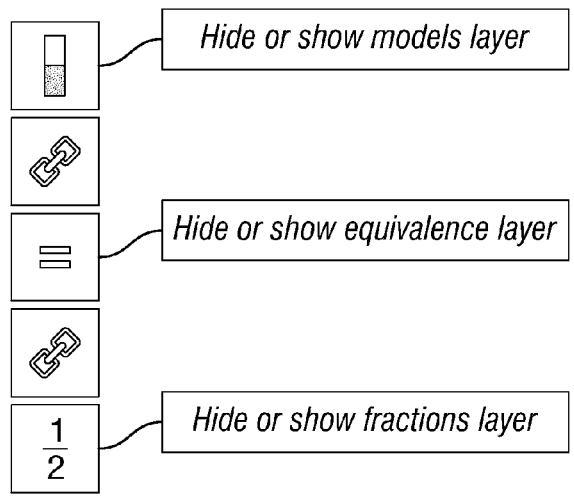
FIG. 6 is an example screen shot showing icons for the hide or show models layer, hide or show equivalence layer, and hide or show fractions layer, according to an embodiment.

Procedure:

In an embodiment, in Tool Mode, Hide and Show is implemented with a simple click of an icon that appears on the right side of the screen, for example. An embodiment provides an icon for each of the model, equivalence, and fraction layers, such as shown in FIG. 6. When a layer is hidden, its icon is grayed out. In Activity Mode, Hide and Show is implemented in the authoring spreadsheet. There are up to five hide and show variables in tools that have three layers: show layer 1, show layer 3, show layers 1 and 2, show layers 2 and 3, show layers 1 and 3. In Authoring Mode, Hide and Show may be implemented with the same icons as in Tool Mode.

Figure 29B:
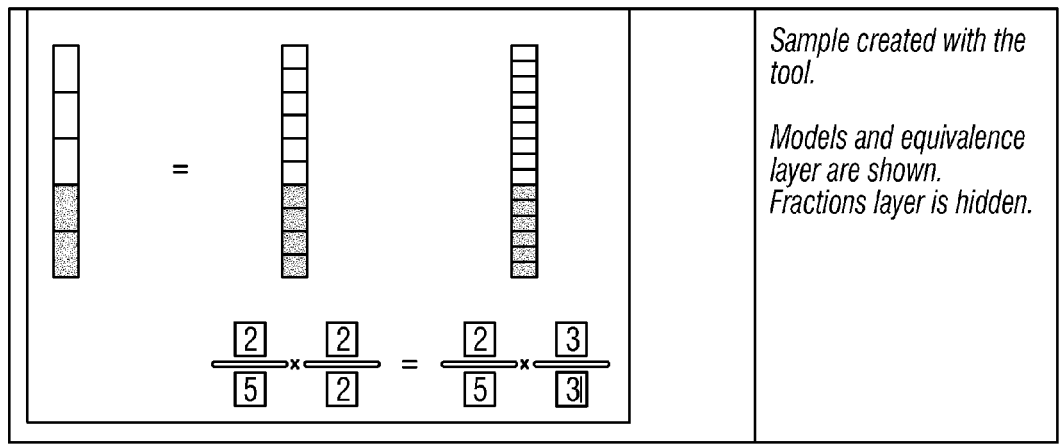
FIG. 29 is a table containing screens, each of which help demonstrate the results of using the spreadsheet to invoke Hide and Show, according to an embodiment.

An embodiment using the spreadsheet to invoke Hide and Show can be understood with reference to FIG. 29. FIG. 29, as shown on two sheets, FIG. 29*a* and FIG. 29*b*, is a table containing screens, each of which help demonstrate the results of using the spreadsheet to invoke Hide and Show. The first four images are taken from an example Big Idea 5, which covers the topic of equivalent fractions. Such images employ the Equivalent Fractions Tool. The author used different settings within the spreadsheet to Hide or Show different layers on the screen. This was done to help students progress from concrete-representational to abstract, numbers-only representations.

Another embodiment can be understood with reference to FIG. 6, which illustrates icons for the hide or show models layer, hide or show equivalence layer, and hide or show fractions layer, according to an embodiment and FIG. 5, which illustrates an example placement of the Hide and Show icons in the upper right corner of the screen.

Result:

By using the Hide and Show feature a teacher can present the students a sequence of educational visual representations. The first step in the sequence may be a presentation that includes only pictorial models. The second step may be a combination of pictorial models and numeric representations, using the fractions themselves. The third step may include the fractions, omitting the pictorial representations. Refer to FIG. 7 for example screen shots of the above discussed three-step sequence.

Feature #2: Link and Unlink
Purpose:

In an embodiment, Link and Unlink determines the causal relationship between editing numbers and pictures, or editing numbers and words. At times this relationship may be a one-to-one correspondence, where there is a close association between numbers and models. For example, when the user types a fraction (or enters numbers into a sentence), a pictorial model may be rendered that corresponds to the user's typed numbers. As another example, when the user populates a visual model, the corresponding fractions (or numbers in sentences) may become populated. At other times it is desirable to disassociate these fields and erase the one-to-one correspondence. In the disassociated state, numbers may be entered, sentences completed, and models populated without any causal effect in the companion representation. Thus, Link and Unlink enables such states of association and disassociation.

In an embodiment, Link and Unlink may be implemented using an observer pattern where the linked components emit events when they change. In this pattern, the corresponding components listen for these events and synchronize themselves to the changed value. For instance, in the identifying fractions interaction, if the fraction model component and the fraction number component are visible and linked and the user types into the numerator box, then the fraction number component calculates its new value and if this new value is different than its previous value, then it emits a NUMERATOR_CHANGED event. When the fraction model component receives this event, it reads the numerator and denominator from the fraction number component and uses these values to set its own numerator and denominator and then redraws itself using these new values. When components are unlinked, such components simply stop listening for these synchronization events.

Figure 8:
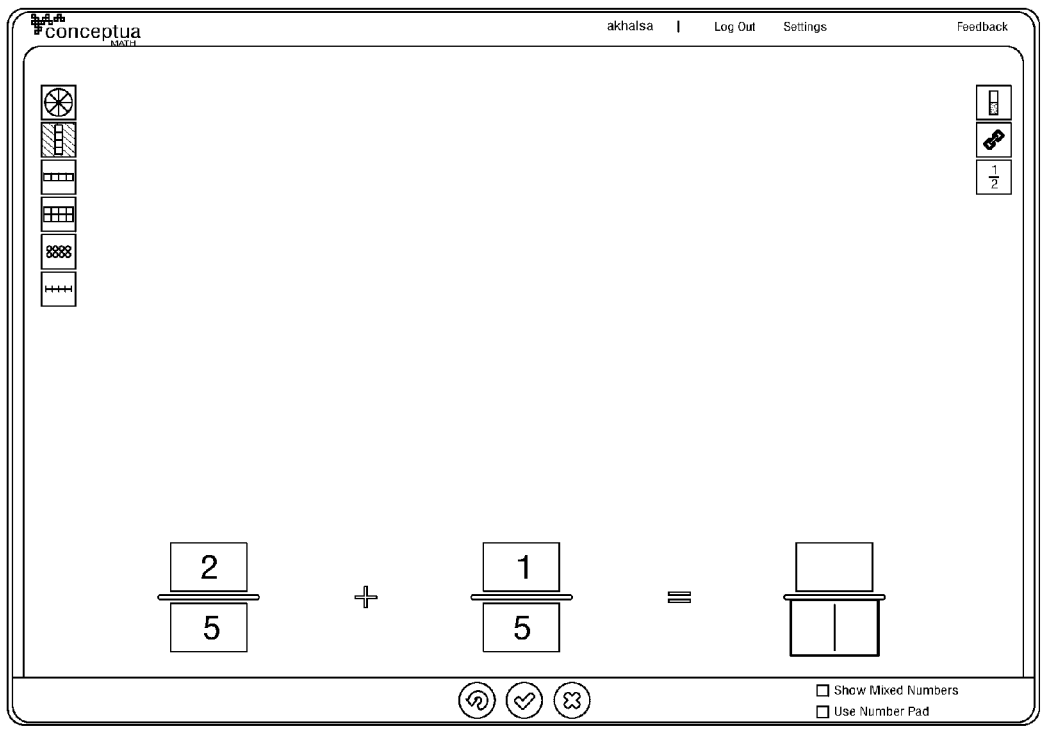
FIG. 8 is an example screen shot for a model layer and fraction layer which are unlinked, according to an embodiment.
Figure 8:
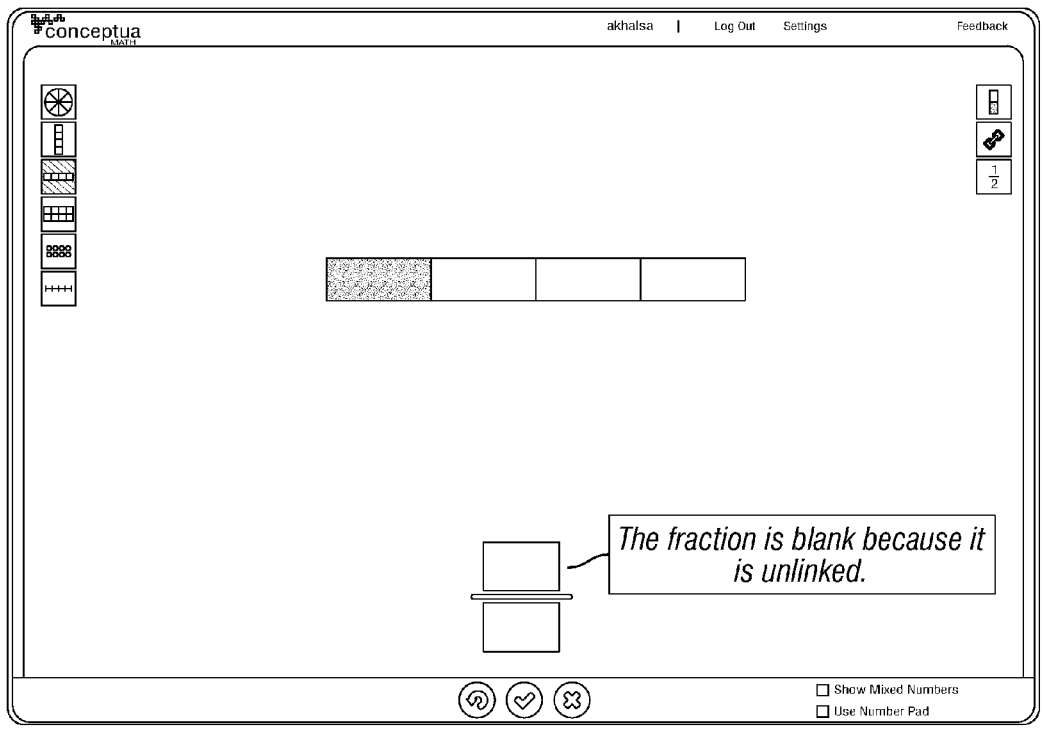

Consider the use of Unlink in an early topic of learning about Identifying Fractions. In Tool Mode, a teacher may present a visual model of a fraction and ask the students to identify the name of the fraction. This can be accomplished by unlinking the model and the fraction. When the teacher creates the model, the fraction is not populated. Instead, it is left blank. This feature gives the student the opportunity to fill in the blank. An example is illustrated in FIG. 8.

Figure 9:
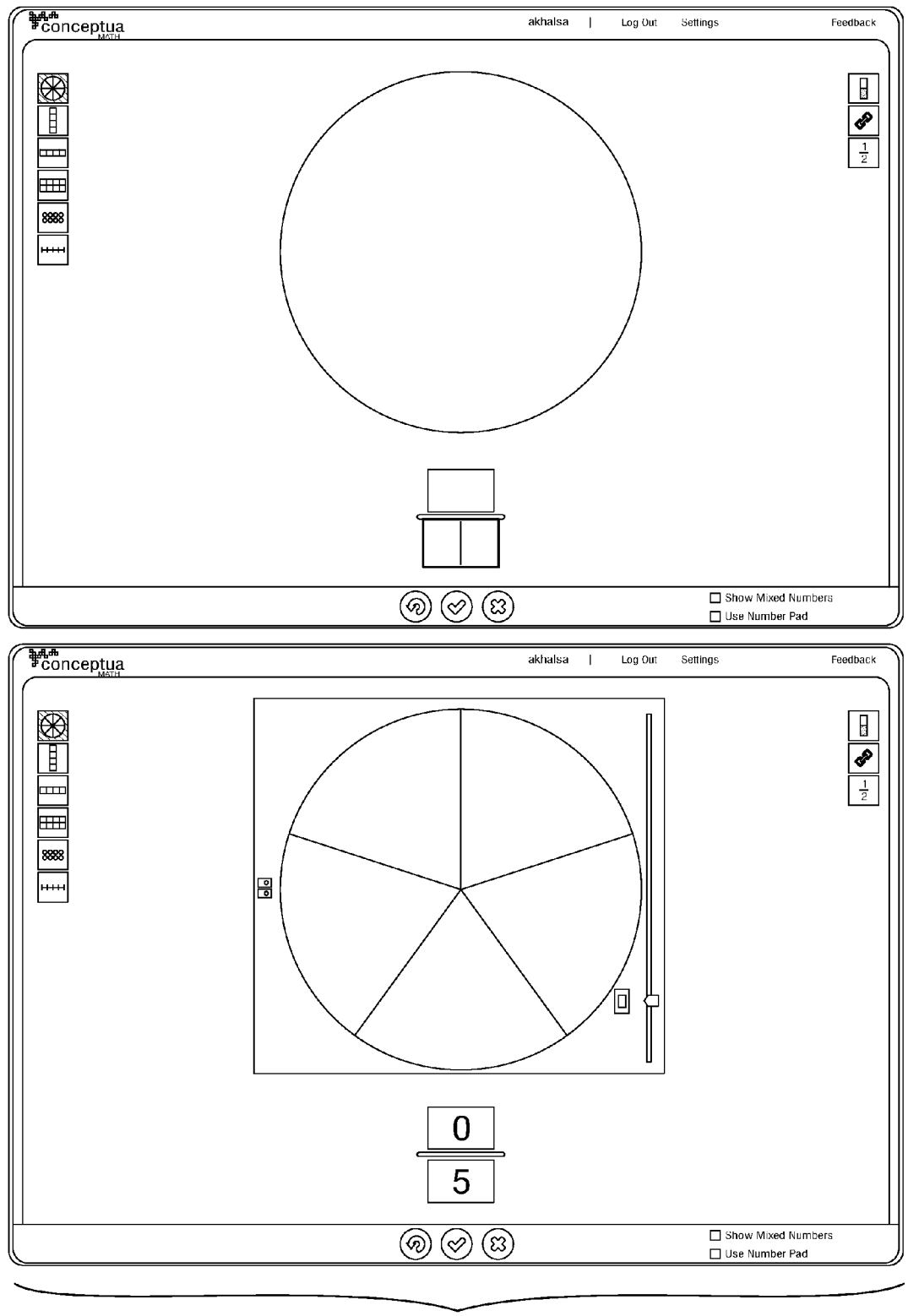
FIG. 9 shows a model in its unpopulated state (before the students starts her work), its partially populated state (the student is partially done), and its completed state, according to an embodiment.

Consider a linked presentation of Identifying Fractions. As an example, suppose the students are given the following instruction: "Come to the whiteboard in the front of the room. I will indicate a fraction and you can make that fraction either with the model or the numbers." A student comes to the front of the room and the teacher states, "Please show the class three fifths." The student chooses to populate the model. FIG. 9 shows the model in its unpopulated state (before the students starts her work), its partially populated state (the student is partially done), and its completed state. Upon accurately completing the model, the fraction is rendered because the model and the fraction are linked.

Figure 10:
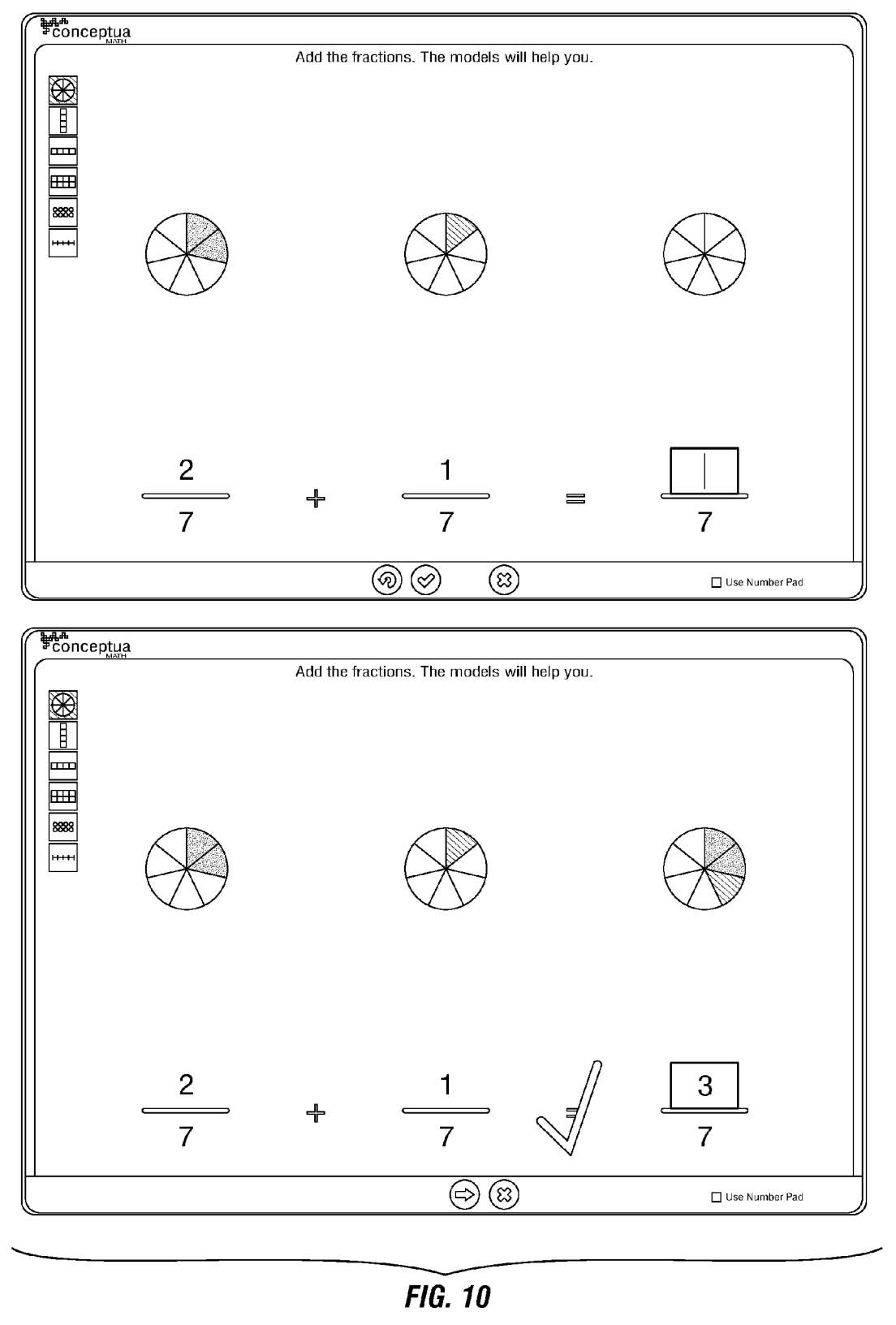

The Linked and Unlinked feature according to an embodiment may play a pivotal role in Activity Mode. FIG. 10 shows an example of a problem where a student is adding fractions with common denominators and the linked option has been employed within the spreadsheet created by the author. The screen on the left displays the problem as it is first encountered by the student. As is the case with Activity Mode, the problem includes a written instruction. In this case, the instruction reads, "Add the fractions. The models will help you." The student has only one task to accomplish: writing in the numerator of the sum. Because Linked is built into this problem, the model becomes populated when the student types the number. It is through this linkage, i.e. this association between the number and the model, that the student receives the visual confirmation in the model that their selection of "3" makes sense and is the correct answer.

It should be appreciated that in an embodiment, the spreadsheet author invokes this linkage by setting a variable for this specific problem. The spreadsheet contains a row, e.g. row 26, which is labeled as linked/numberandmanipulative. That label is entered on the first column, to the left side of the spreadsheet. The columns to the right set the state of each variable for each problem. In this column, the text in row 26 is "true." This sets the variable for "Linked". If the text read "false", then the manipulative and numerator in this problem would be unlinked.

Figure 11:
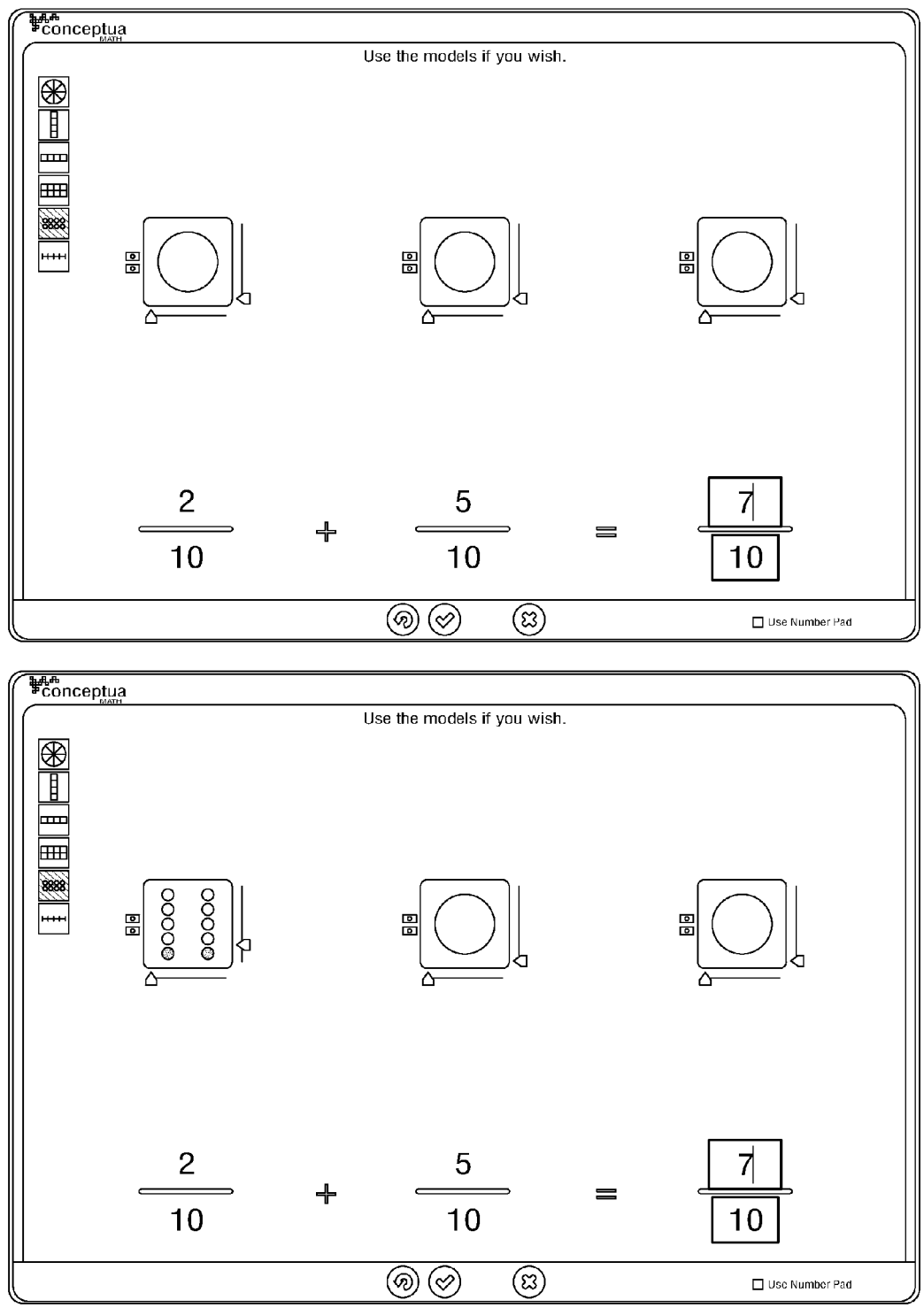
FIG. 11 shows example screen shots showing at left, the model layer unlinked to the fraction layer, and at right, the model layer unlinked and one model changed by the student to match the first addend, according to an embodiment.

As the student moves forward in the activity, a subsequent problem uses the unlinked state. The student is asked to add two fractions and the instructions state: "Use the models if you wish." Here, as depicted in FIG. 11, the models are presented as a voluntary support. If the student knows the answer and has internalized the logic of adding fractions to the extent that they no longer require the support of models, they can simply add the fraction. On the left, the student has added the fraction without ever touching the models. Because this mode is in the unlinked state, the models remain neutral or unpopulated. On the right, a different student has populated the first model only and then realized that he/she no longer required visual support to complete the problem. It is with this type of flexibility that an embodiment of the computer-implemented methodology provides the carefully-stages scaffolding that allows students to internally construct mental representations of fractions.

Figure 12:
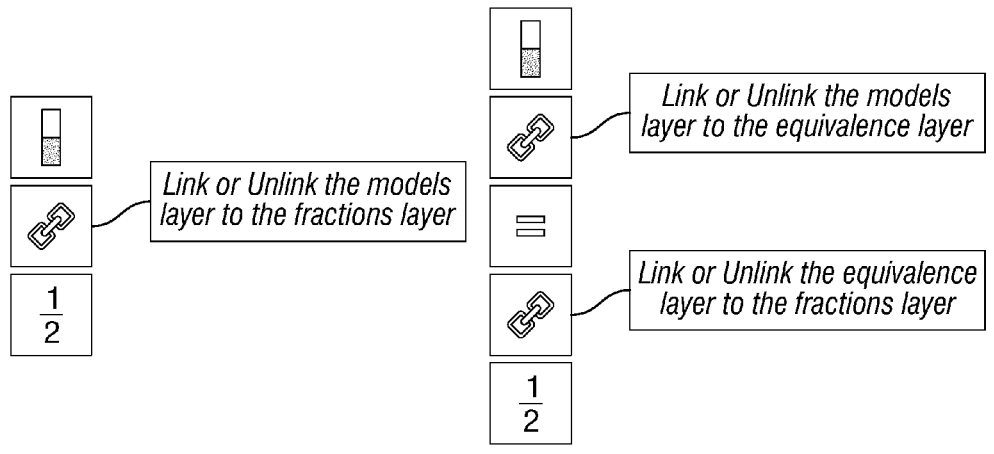
FIG. 12 shows link icons between two layers in three particular placements, according to an embodiment.
Figure 18:
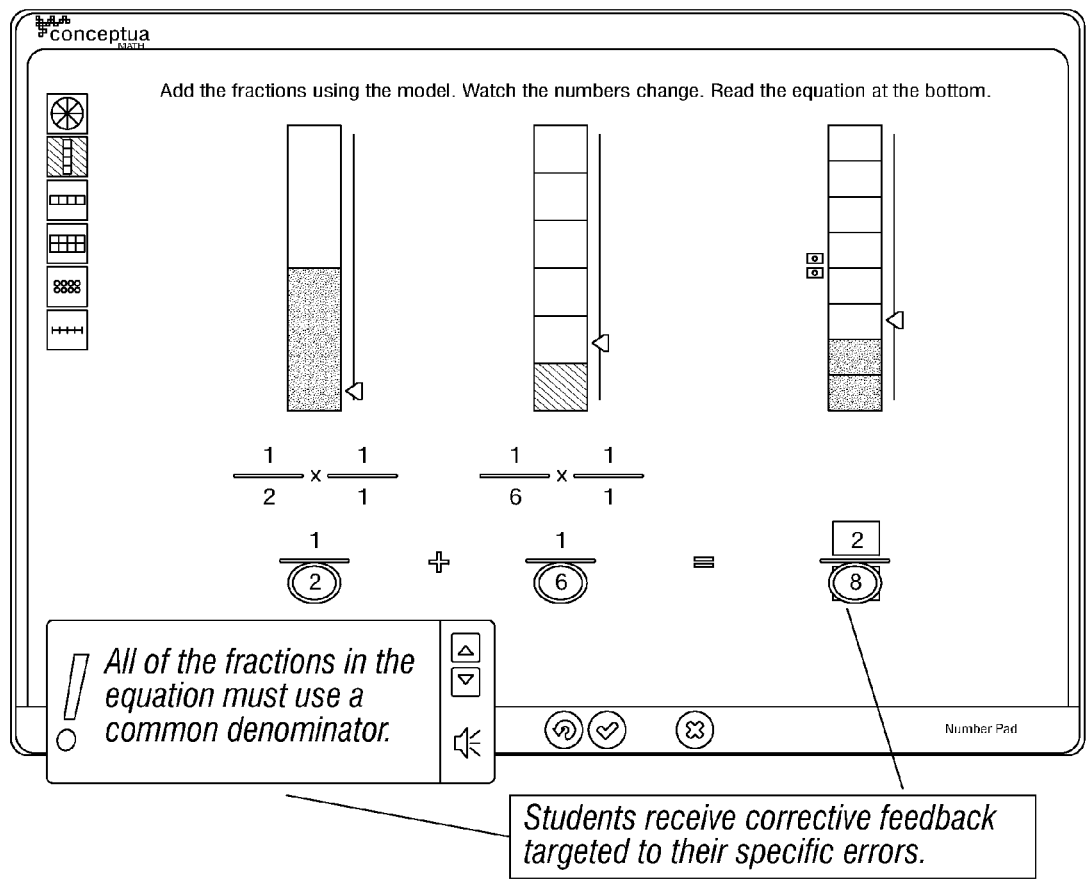
FIG. 18 is an example screen shot showing corrective feedback targeted to specific errors, according to an embodiment.

Procedure:

In an embodiment, in Tool Mode, Link and Unlink is implemented with a simple click of an icon that appears on the right side of the screen. There is one icon for tools that have two layers, and two icons for tools that have three layers. When an icon is set to unlink, its icon is grayed out. Refer to FIG. 12 for example icons according to an embodiment. In Activity Mode, Link and unlink is implemented in the authoring spreadsheet. There are up to three variables for link and unlink in the spreadsheet authoring system. The tools that have three variables for Unlink and Unlink include the tools that have three-layers. These include, but are not limited to:

Equivalent Fractions
Equivalent Fractions with Word Sentences
Finding Common Denominators
Adding Fractions with Uncommon Denominators
Subtracting Fractions with Uncommon Denominators One of these tools, Adding Fractions with Uncommon Denominators, is depicted in FIG. 4 and in FIG. 18. The three layers are clearly shown. The top layer displays the manipulative models. The middle layer shows the fractions, some of which are multiplied by a "one fraction," or x/x. In FIG. 4, there are two "one fractions," 2/2 and 1/1. The bottom layer, or third layer, contains the fractions that result from the multiplication performed in the middle layer. In an embodiment, these three layers are called: the manipulative layer, the equivalence layer, and the number layer.

According to an embodiment, In the spreadsheet and in authoring mode, the three link and unlink variables that may be controlled are 1) linking and unlinking the number and the manipulative, 2) linking and unlinking the equivalence and the manipulative, and 3) linking and unlinking the equivalence and the number. For example, these three variables may be named numberAndManipulative, manipulativeAndEquivalence, and numberAndEquivalence. In the spreadsheet, these variables are controlled by indicating whether any of these three conditions is "true" or "false." In Authoring Mode, Link and Unlink may be implemented with the same icons as in Tool Mode.

Result:

The Link and Unlink feature provides flexibility in activity development. FIGS. 8, 9, and 10 provide examples of the progression from concepts to procedures that is facilitated through the use of the feature. It is with this type of flexibility that the computer-implemented methodology provides the carefully-stages scaffolding that allows students to internally construct mental representations of fractions.

Feature #3: Lock and Unlock

Purpose:

In an embodiment, Lock and Unlock is an authoring feature that limits the responses students are required to make in a given problem. It is with Lock and Unlock that an author may require a student to enter, for example, numerators only, denominators only, or otherwise focus student responses on a specific element. Lock and Unlock may be applied to any portion of the screen that can be altered by a student. Locking an element omits the ability to change that value. Unlocking the element and allows the student to edit that value. Commonly, unlocked fields are left blank.

Figure 13:
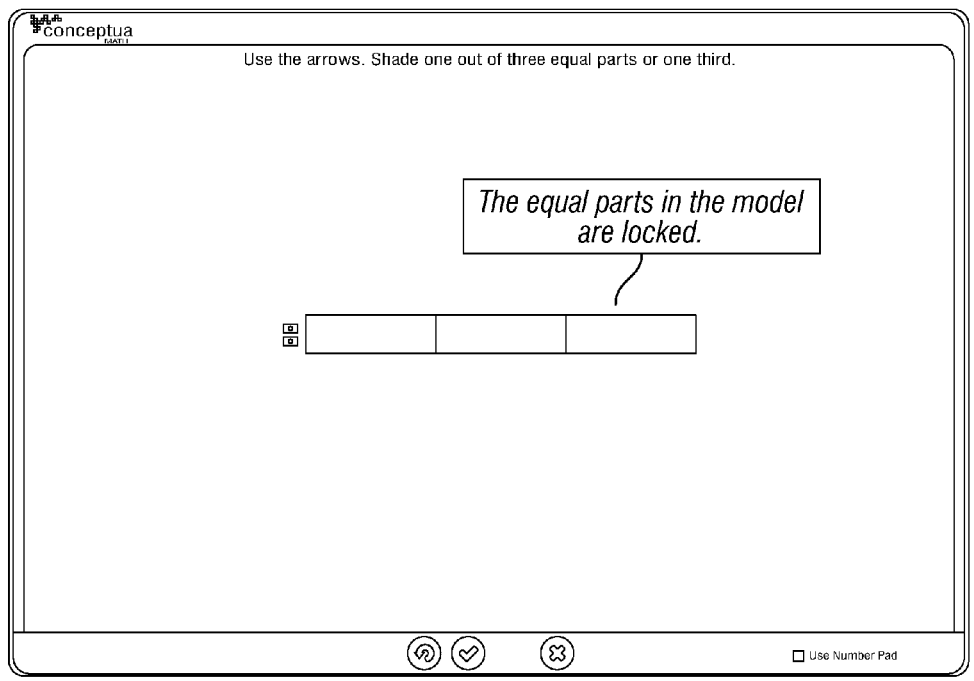
FIG. 13 is an example screen shot showing equal parts in a model that are locked, according to an embodiment.

In an embodiment, Lock and Unlock pertain to authored activities and they are designed to provide focus to a student in a constrained environment when there is no guarantee of a teacher being present. Consider the example in FIG. 13:

Locked equal parts. The student is asked to shade the model and make the fraction "one third." The activity is constrained so that the student is not required to create the equal parts on their own. In this example, the denominator of the fraction (as represented by the model) has been set as three (thirds) and locked. The student cannot change its value, thus, as shown in the figure, there is no slider available for changing the number of equal parts.

Lock and unlock determine the editability of components. A locked component cannot be directly edited by the student, an unlocked component can be directly edited by the student. Editability is distinguished from mutabililty in that an locked component's value, even though it cannot be directly edited by the user, can still be changed if it is linked to another component and that component's value changes. In an embodiment, locking may be accomplished in any number of ways. One way may be to make the locked component stop listening to user input from the mouse or keyboard. Another way may be to make the locked component ignore user input from the mouse or keyboard. For instance, the fraction number component sets a locked property to true. Once this property is set to true, any user input received from the keyboard is ignored. When the component is unlocked, the locked property is set to false and a subsequent keyboard input is processed.

According to an embodiment, another way to implement locking is for GUI controls that change the value of the component to be removed or hidden. For instance, if the denominator (the number of equal parts) of the pie model is locked, then the slider control that changes the number of equal parts is hidden. This prevents the student from directly changing the model's denominator. Importantly, this implementation of locking is distinguished from making the model's denominator immutable. If the denominator were immutable, then linking another component to the denominator would have no effect. This is undesirable; it is important that a component that is locked can also be linked to another component and if that other component's value changes, then the locked component's value should change. This may be understood with reference to FIG. 9, which shows an embodiment that uses the identify fractions tool, with a locked fraction pie component and an unlocked fraction number component that are linked. In this case, the student cannot directly change the value of the locked fraction pie by using the slider, but the student can change the fraction number component by typing numbers into it. Because the fraction number is linked to the fraction pie, it in turn changes the value of the fraction pie. This is an important interaction, because the student may construct a visual model by inputting numbers only. This example illustrates that the locked fraction pie's value remains mutable in even in the locked state.

Figure 14:
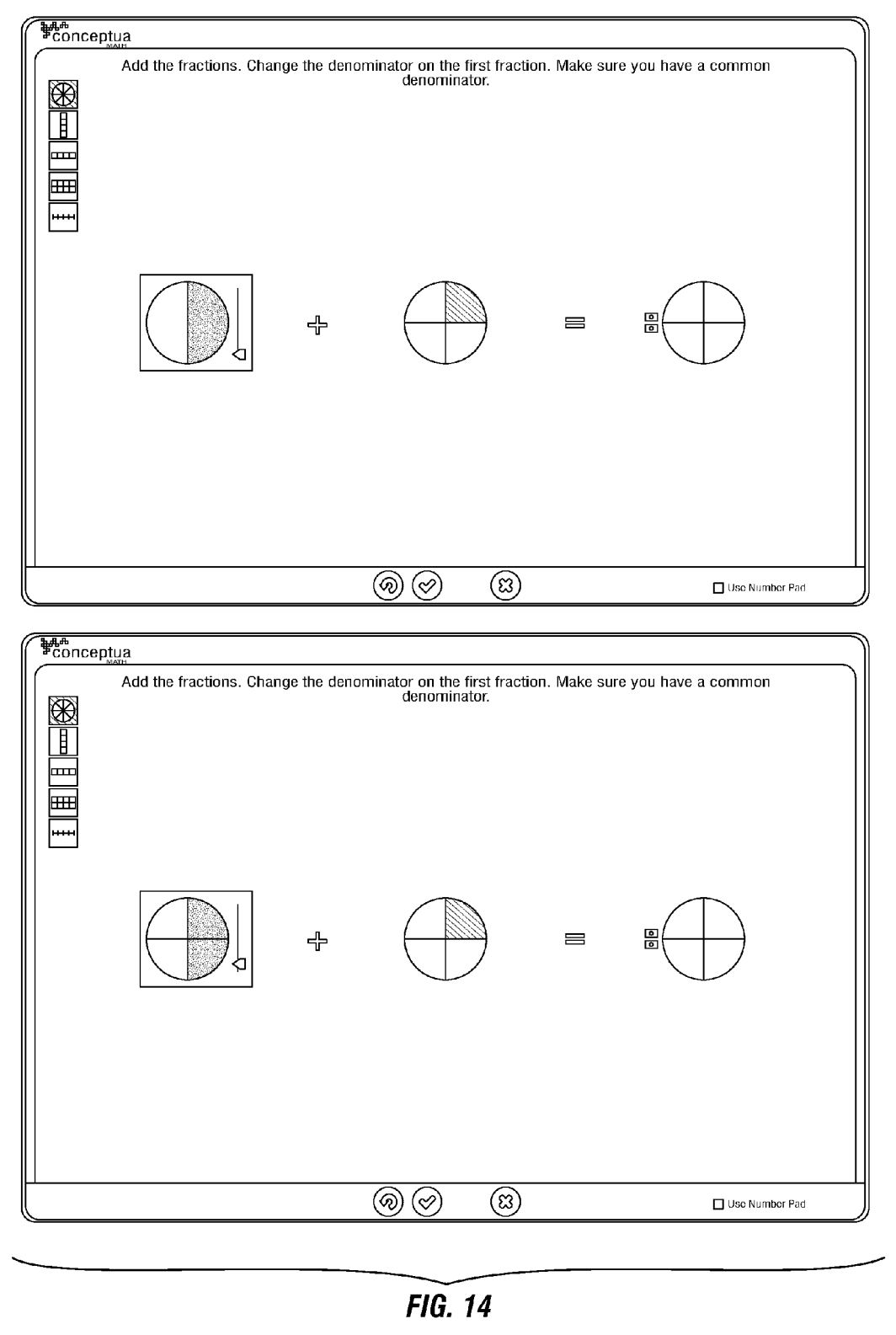

The example of a locked numerator and unlocked denominator may be understood with reference to FIG. 14: Locked numerator in a model. FIG. 14 demonstrates a pedagogical design that is unique to the computer-implemented methodology or system. FIG. 14 depicts an addition with uncommon denominators problem. The student is asked to solve the problem using visual models only. Initially, the models represent ½+¼. The sum has already been rendered in a model that has a locked denominator (fourths) and an unlocked numerator which is blank. The final answer requires the student to populate three of the four equal shares in the model for the sum. As part of answering the question, however, the student is required to "change the denominator on the first fraction.", in other words, they are required to create common denominators. The shaded area has been pre-determined and locked. One half of the entire circle has been shaded. This addend model is the opposite of the sum model. The addend model has a locked numerator (one half) and an unlocked denominator (number of equal parts). On the right side of the figure, the student has changed the number of equal parts and effectively re-stated the fraction as ²⁄₄. Now, the student can visually see that ²⁄₄ can be added to ¼ in order to make ¾.

A common use of Lock and Unlock is in constructing a problem where entire portions are required to be fixed and unaltered. In both FIG. 10: Activity Mode—Linked and FIG. 11: The Flexibility of using Unlinked, the addends of the equations are completely locked.

In an embodiment, three tools employ a special case version of Lock, cited hereinbelow. In these tools, the lock feature is employed as a method for preparing fractions for manipulation on the screen. These tools include Comparing Fractions, Order Fractions on a Number Line, and Unitizing with Pattern Blocks. In all three cases, lock has a utilitarian function and must be employed in order for a user to start interacting with the fractions. The user is given the opportunity to place their own fractions onto the screen. The user enters a numerator and denominator in each of one, two, or three blank fraction(s). When the user is satisfied with the fraction(s) they have entered, they lock these fractions, e.g. by using the icon displayed in FIG. 15. Once this locking action has been accomplished, the user may display the fraction(s) in the form of various models, and may act on the fractions according to the function of the specific tool. One example, involving the Compare Tool, is described in this document. In Comparing Fractions and Ordering Fractions on a Number Line, the user does not have an "unlock" option. The fractions start in the unlocked state. Once the use locks them, the user may employ them, but the user cannot unlock them and re-state their value. In order to act on a new set of fractions, the user resets the tool, effectively completing their session with one set of fractions, and is then given two or three unlocked fractions. These unlocked fractions are ready to be populated, locked, and acted upon.

Figure 15:
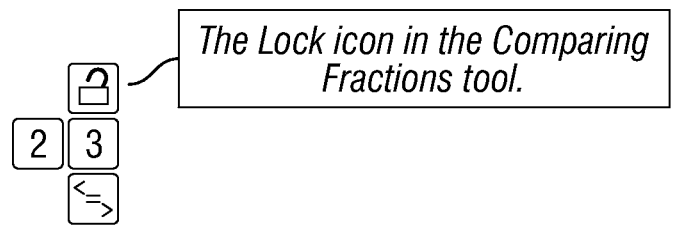
FIG. 15 shows a lock icon, according to an embodiment.
Figure 19:
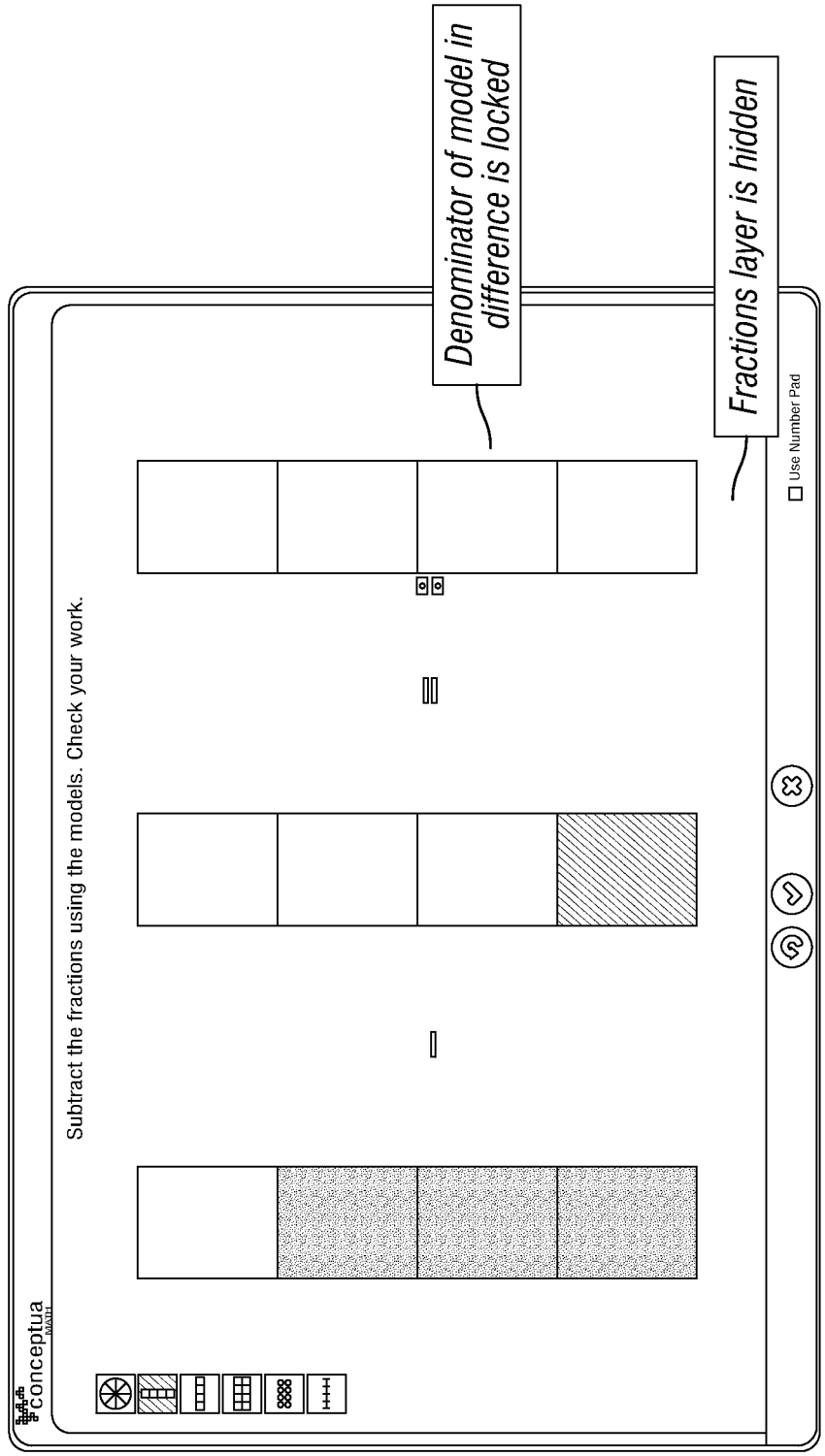
FIG. 19 is an example screen shot showing that the denominator of the model in the sum is locked and that the fraction layer is hidden, according to an embodiment.

Procedure:

In an embodiment, a version of lock may use the icon such as displayed in FIG. 15: The Lock Icon. In an embodiment in Activity Mode, Lock and Unlock is implemented in the authoring spreadsheet. There may be many locations on a given page where lock and unlock may be employed. In an embodiment, there are up to fourteen variables for lock and unlock in the spreadsheet authoring system. For the purposes of the discussion herein, the following examples, each related to a Figure, elucidate the various variables that may be controlled by Lock and Unlock:

In FIG. 19, the two fractions that constitute the minuend and subtrahend (¾ and ¼) are locked in both the numerator and denominator. As a result, the student cannot change the problem. In the difference, or answer, the denominator is locked (fourths), but the numerator is unlocked. The student must create the numerator.

Figure 21:
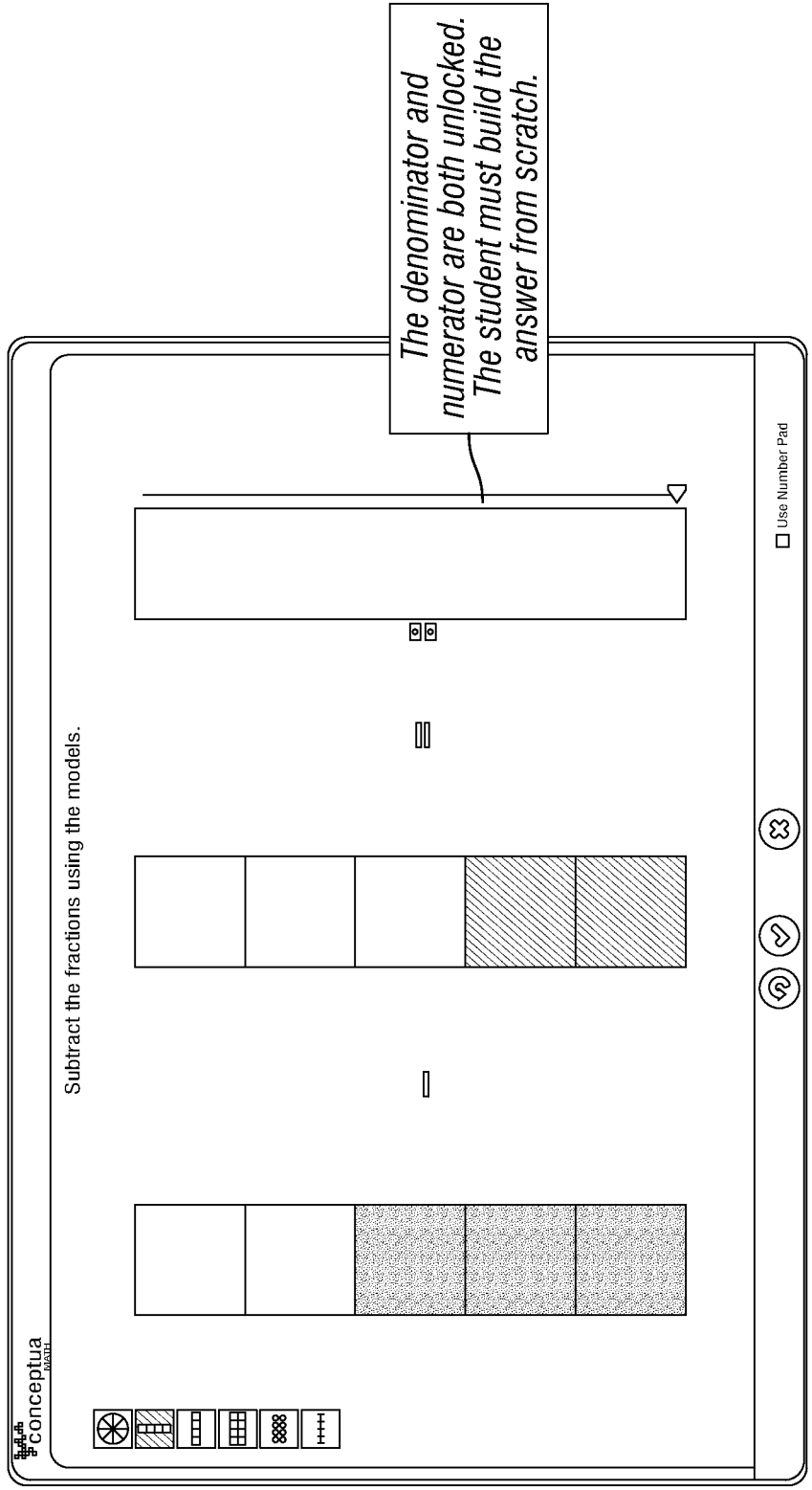
FIG. 21 is an example screen shot for subtracting the fractions using models where the denominator and numerator of the difference are both unlocked, according to an embodiment.

In FIG. 21, the two fractions that constitute the minuend and subtrahend (⅗ and ⅖) are locked in both the numerator and denominator. As a result, the student cannot change the problem. In the difference, or answer, both the denominator and the numerator are unlocked. The student must create the denominator and the numerator.

Figure 23:
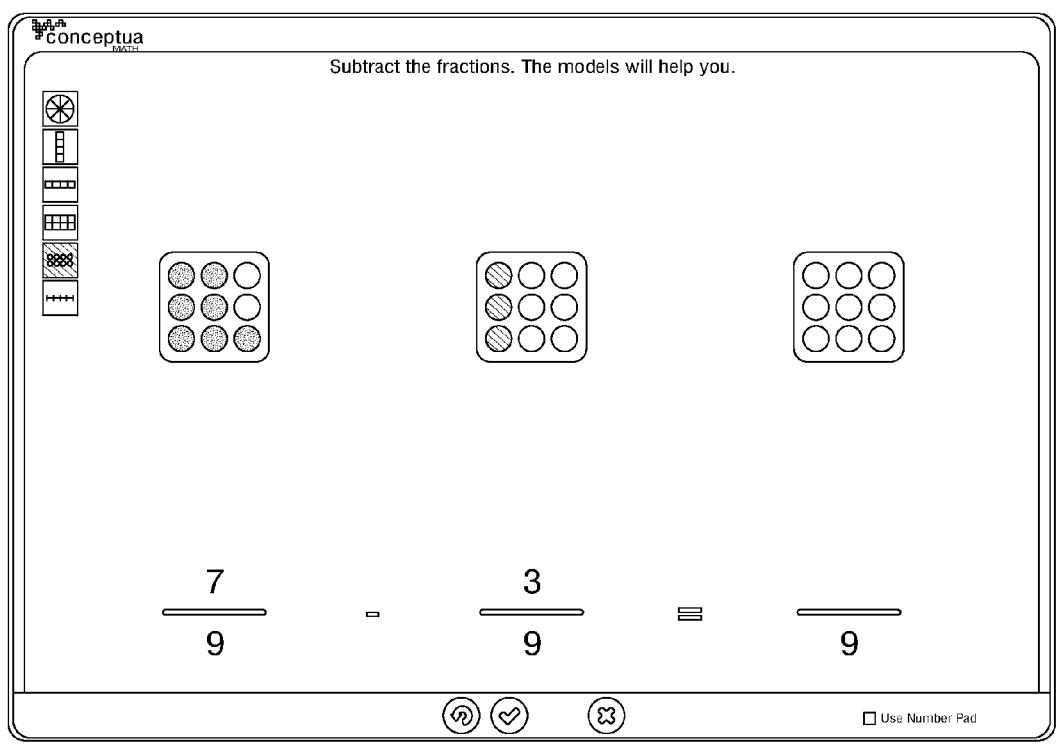
FIG. 23 is an example screen shot showing the discrete model, also called the dot model, according to an embodiment.

In FIG. 23, the two fractions that constitute the minuend and subtrahend (⅞ and ⅜) are locked in both the numerator and denominator. This is true for both models and numbers. Thus, there are eight different locked elements in these two fractions. As a result, the student cannot change the problem, nor are they asked to enter their own numbers or change the pictures in the minuend or subtrahend. In the difference, or answer, the numerators of both the model and number are unlocked. The student must create both numerators in order to answer the problem.

In an embodiment in Authoring Mode, Lock and Unlock may be implemented using the same icons as in Tool Mode, but the icon may be attributable to specific text fields and portions of models. It is possible to Lock or Unlock the numerator and denominator of each fraction model, e.g. the equal parts, the shaded parts, and each fraction, e.g. a text field for each numerator and denominator.

Result:

According to an embodiment, some important uses of Lock and Unlock are those that involve strategically focusing the student on specific responses. Student activities as provided in an embodiment may place emphasis on the sequence of problems with which students are presented. Lock and Unlock allow an activity author to focus a student's attention on one specific answer field, or one specific portion of a model, as illustrated in FIG. 10. It is with this type of authoring that the computer-implemented methodology provides the focus that allows students to clearly understand expectations, and provides the scaffolding to build cognitive models.

Feature #4: Multiple models

Figure 16:
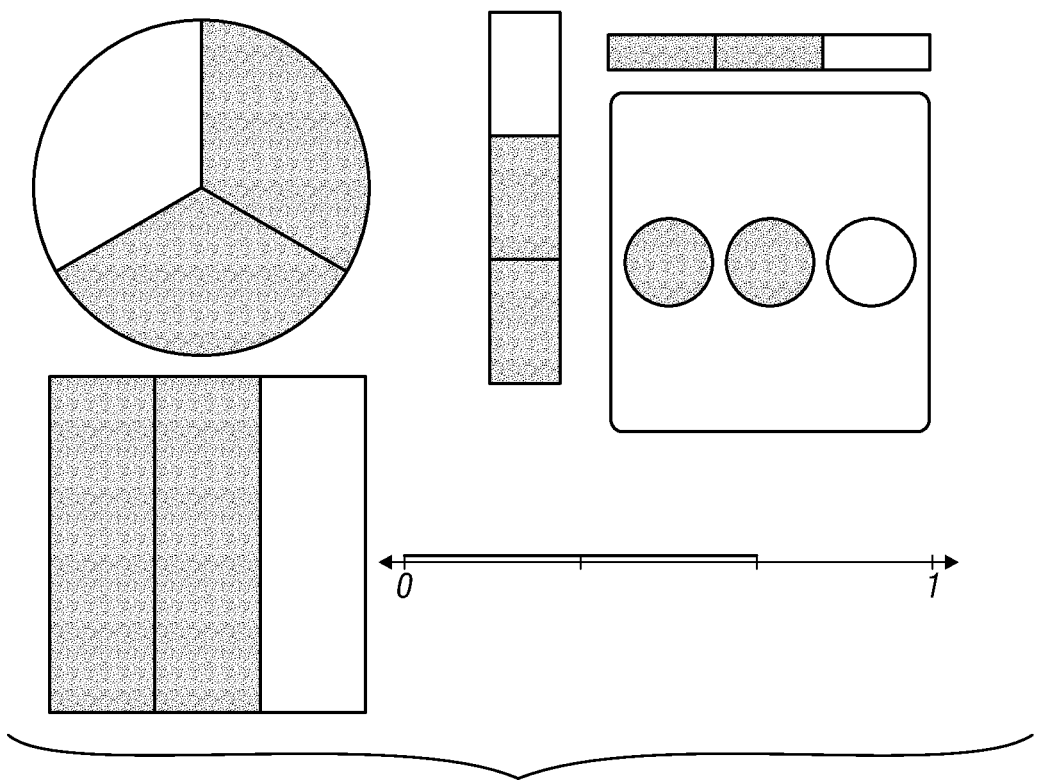
FIG. 16 shows particular types of models, according to an embodiment.

Purpose:

When teaching fractions and other mathematical subjects, research has shown that students should be subject to the use of multiple visual models. Thus, an embodiment provides a multiple models implementation that allows a student or a teacher to easily switch the visual representation, i.e. the visual model. The research also shows that different models represent different ways of thinking about fractions. For instance, an area-of-a-rectangle model portrays the fraction as a portion of a whole. In this model, $2/3$ and $4/6$ occupy the identical area. A model that employs dots is often described as a discrete model. When there are three dots and two of those are shaded, the fraction being represented is two thirds. There is no "whole", other than the collection of three dots. It should be appreciated that an embodiment provides configuring the system such that a student may fill in any of the circles in the model where the filled-in circles are not required to be contiguous. For example, the foregoing may mean that in a collection of eight dots, the student may shade two dots that are not next to one another in order to portray $2/8$. A number line may be used to portray a distance model, where $2/3$ is the distance traveled between the zero marker on the left and the number one on the right. A fraction pie or fraction circle that is segmented into discrete sections depicts a fraction in a manner that combines the concept of area (the portion of the whole circle that is shaded) with the discrete model (one of three equal shares is shaded). An embodiment can be understood with reference to FIG. 16: The Visual Models employed in the Identifying Fractions tool. Such tool shows the manner in which the fraction $2/3$ is displayed by the six models that are incorporated in the Identifying Fractions tools.

Figure 17:
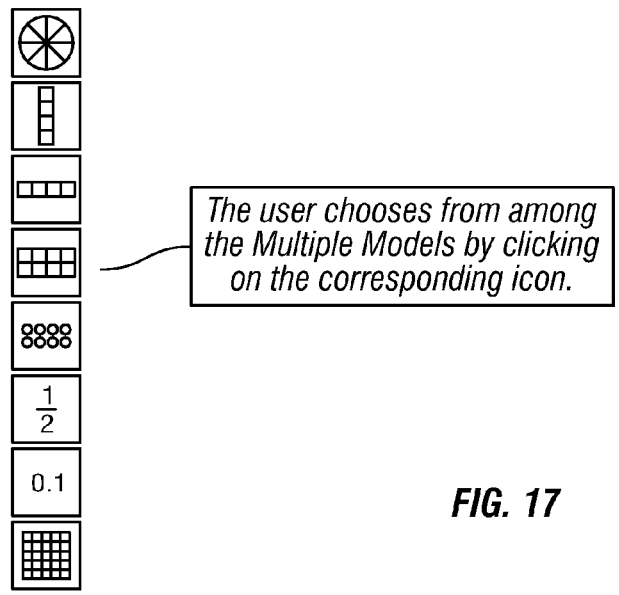
FIG. 17 shows a set of icons each of which corresponds to a particular model, according to an embodiment.

The Multiple Models feature as provided in an embodiment makes it possible to interchange models, to select a specific model, or to select a set of models for a given problem. In an embodiment, the tools use interchangeable models with the exception of Unitizing with Pattern Blocks and Unitizing on a Grid. Some models may be employed in any of the fractions computations that have been discussed. The dot model or discrete model may not be useful in interactions that involve equivalent fractions or the addition and subtraction of fractions with uncommon denominators. This is because it may not be helpful to attempt to show that one-out-of-three dots are equivalent to two-out-of-six dots. In an embodiment, the tools which are used either on their own or as a basis for authoring student activities employ six interchangeable models. By employing this capability, the system offers the benefit of flexible thinking about fractions, as indicated in the research, and offers the related benefit of having students understand fractions to have more than one meaning: parts of a whole, part of a set, a distance along a line, a numeric value, and an area. An embodiment includes, but is not limited to, the following models:

fractions Circle
vertical fraction bar
horizontal fraction bar
dot model, or discrete model
number line
numeric representation
decimal
decimal grid Procedure:

In an embodiment, in Tool Mode, Multiple Models is implemented with a simple click of a set of icons that appears on the left side of the screen. There is one icon for each available model. FIG. 17 illustrates a particular implementation of a set of icons. As well, in an embodiment, in Activity Mode, the set of available models may be customized in the authoring spreadsheet. As a result, students do not always receive a choice of models, as there are some problems where the author has determined that the interaction should be constrained to just one model. In an embodiment, there are up to 63 combinations of visual model choices in most of the tools, as 63 is the total number of combinations of any six items. It is contemplated that in Authoring Mode, the ability to use or make available the visual models as is in the spreadsheet activity mode may be available.

Multiple models may be implemented on a computing system in a number of ways. In one embodiment, an object oriented approach is taken. A template class is created that declares an application programming interface for the methods and properties common to all fraction models. A default implementation, e.g. of such methods and properties, is created. Each individual fraction model class is derived from this template class. Each individual model class implements, e.g. on a computer, the logic to layout the model, draw the model, handle hit-testing on the model and other functions common to all models; however, a custom implementation may be created for each given model. For instance, the hit testing method of the template class declares a function called pointToNumerator, that takes a horizontal pixel value and a vertical pixel value that represent the local coordinates of the mouse pointer within the model. The computer-implemented method returns the index of the equal share that the point is over in the model or −1 if it is not over an equal share. To implement its version of this common method, the computer-implemented fraction pie model first determines if the given point is within the fraction pie's rectangular bounds. If it is not, −1 is returned. If it is, then the fraction pie computer-implemented logic uses the given pixel coordinates and its center pixel coordinate to compute the angle in degrees of the line created by the center point and the given point. The computer-implemented logic then computes the arc length, in degrees, represented by one equal share by dividing 360 by the denominator. It then divides the angle in degrees by the arc in degrees to compute the index of the equal share. The same computer-implemented method is implemented differently for the number line model. This model does a similar bounds check, returning −1 if the given pixel value is not within its bounds. If it is within its bounds, it computes this segment's horizontal length by subtracting the horizontal pixel value of the zero point on the number line from the given horizontal point value. It then computes the horizontal length of an equal share by computing the horizontal pixel length of the number line and dividing it by the total number of equal shares. It then divides the segment length by the length of one equal share to compute the index of the equal share. In addition to implementations of common methods, some models implement model specific methods or properties. For instance, the number line model implements a maximum value property that determines the value on the right end of the number line.

Importantly, when the student selects a model from the available models, the link/unlink feature and other aspects of the system that change the values in the currently selected model must be reflected in the newly selected model. This can be done in a number of ways. In an embodiment, the system logic may synchronize all changes to all available models, so that when a new model is selected, it already has the necessary, e.g. updated, values. In one embodiment, a model container holds shadow copies of the necessary model values and the embodiment synchronizes new models with these values as such new models are selected. In addition, the embodiment may delay allocation of a new model until the first time such new model is selected.

Result:

The Multiple Models feature leads to several unique aspects. One aspect is that it enables the computer-implemented methodology to correlate closely with most any published mathematics curricula for elementary and middle school. A key purpose for the computer-implemented methodology is to supplement the basal curriculum employed in the schools. Different math curricula emphasize different visual models at particular points in the fractions curriculum. It should be appreciated that most of the models employed in such curricula are embodied in embodiments of the computer-implemented methodology. For example, by employing the Tool Mode or the Authoring Mode, teachers may correlate daily lessons directly to the visual models employed in the basal curricula.

A second aspect is that the computer-implemented methodology adapts easily to different learning and teaching styles. Fractions are a difficult topic to teach and learn. When a teacher finds it challenging to convey a given topic using one model, he/she can instantly adapt their lesson and try an alternative model. Similarly, when a student finds one visualization to be confounding, he/she can switch the model and provide an alternative model for an alternative learning path for themselves.

A third aspect in the use of Multiple Models involves flexibility of thinking. It has been found that the research is clear. When a student understands fractions interactions as represented in a variety of visual, representational formats, he or she has a heightened comprehension of fractions content. Various research projects have pointed to the importance of using fraction circles, the area of a rectangle, dots (a discrete model), and the number line. It has been found that the researchers of such research appear to agree that it is desirable for students to be comfortable with multiple renderings. The field is converging on the belief that ultimately, students should recognize the value of fractions on a number line as a measure of their absolute value as a numerical entity. Thus, the computer-implemented methodology, through at least the Multiple Models feature, makes it possible to educate to these lofty goals.

Correction and Feedback

The Salient Feature: Error Detection and Corrective Feedback

One salient feature embodied throughout the computer-implemented methodology is persistent awareness of the correct relationships between models and numbers, addends and sums, and the other relative components of the mathematical equations. This is true for Tool Mode, Activity Mode, and Authoring Mode. For instance, when the problem $7/8-2/8$ is input into the system, the system knows implicitly that the answer is $5/8$. Similarly, the system knows that a model that accompanies $7/8$ must accurately represent $7/8$. Such awareness by the system of such correct relationships enables a corrective device in an embodiment. In the linked state, where the models are rendered automatically and in direct concert with the numerical representations, this corrective device may be redundant and unnecessary. However, in the unlinked state, such relationships may become very important and serves as a corrective device for analyzing the accuracy of student work. Similarly, when the student adds two fractions, such as $1/6+1/6$, and performs such addition with representational models, the system knows that the sum will be a model comprised of $2/6$, whether or not the system displays such sum in the model. As well, the system also knows that the model one third is equivalent to $2/6$. Authoring capabilities built into the spreadsheet for Activity Mode allow an author to determine whether an equivalent fraction will be regarded as an acceptable answer. It should be appreciated, however, that an author or tools user need not consider how to account for correct or incorrect answers, as the system is configured to be aware of, i.e. contain in persistent or non-persistent memory, the correct answer. It should be appreciated that the knowledge of the relationships by the system as described above may be very powerful and their uses by educators may be endless in the pursuit of teaching students.

The Corrective Feedback Subsystem

In an embodiment, the system is aware of the status of the four features and the mathematical relationships between the items on the screen, as described above. Therefore, when an error does occur, the system knows where on the screen, e.g. which item, such error or errors is located. The system provides feedback that focuses the student's attention on any area of the problem that needs correction. An example can be understood with reference to FIG. 18. In FIG. 18, a student attempted to add fractions which have different denominators. The system provided corrective feedback in this example by circling each of the denominators and by provided a message in a message box saying, "All of the fractions in the equation must use a common denominator."

An embodiment provides algorithms that determine an order of correction. For instance, any mismatch between models and numbers gets the first attention. Errors in equal shares or denominators receive attention before errors in shaded parts or numerators. This way, the system provides corrective feedback as a student repairs the errors that are on the screen. It should be appreciated that implementing a particular order of correction may require the student to fix and recheck his or her work several times.

In an embodiment, the system never provides the student with the answer. Rather, the system guides the student in solving the problems. The system does not provide specific inputs or the answer.

In an embodiment, such unique feedback subsystem is made possible because of the thorough amount of data that passes between all aspects of the system. The various combinations of the four features informs the feedback system; feedback is generated based on the students inputs, which layers are visible, which components are linked, which components are not linked, which components are locked, which components are unlocked and which model is selected. For instance, if a component is not visible, then it is not checked for correctness and plays no part in the feedback. If a component is visible and it is linked to another component, then feedback is generated to take into account that the component and its linked component represent a single value, rather than two separate values. This reduces the verbosity of the feedback and reinforces the conceptual correspondence between the linked values. In another example, if the values are not linked, then individual feedback is generated for each component, so the student knows that each component must be addressed to create a fully correct answer. In another example, if a visible component is locked, then the feedback system still considers its value when determining correctness and generating feedback, however, since the component cannot be directly changed by the user, the feedback only refers to its value and does not indicate to the student that they may change the value to create a correct answer. In another example, if a visible component is unlocked, then feedback may be generated that indicates to the student that the value can be changed to create a correct answer.

Putting the Features into Action

Progressing from Visual Concepts to Procedures

FIGS. 19-26 depict the steps taken, in Activity Mode of the system, to help students progress from Concepts to Procedures in studying a particular topic of Subtracting Fractions with Common Denominators, in accordance with an embodiment. It should be appreciated that such screens and comments paint a picture of how the four features of an embodiment are used in combination to facilitate the cognitive progression.

FIG. 19 shows Step 1, models only, where the denominator is determined by being provided in the difference. That is, the denominator in the difference model is locked. The fractions layer is hidden.

Figure 20:
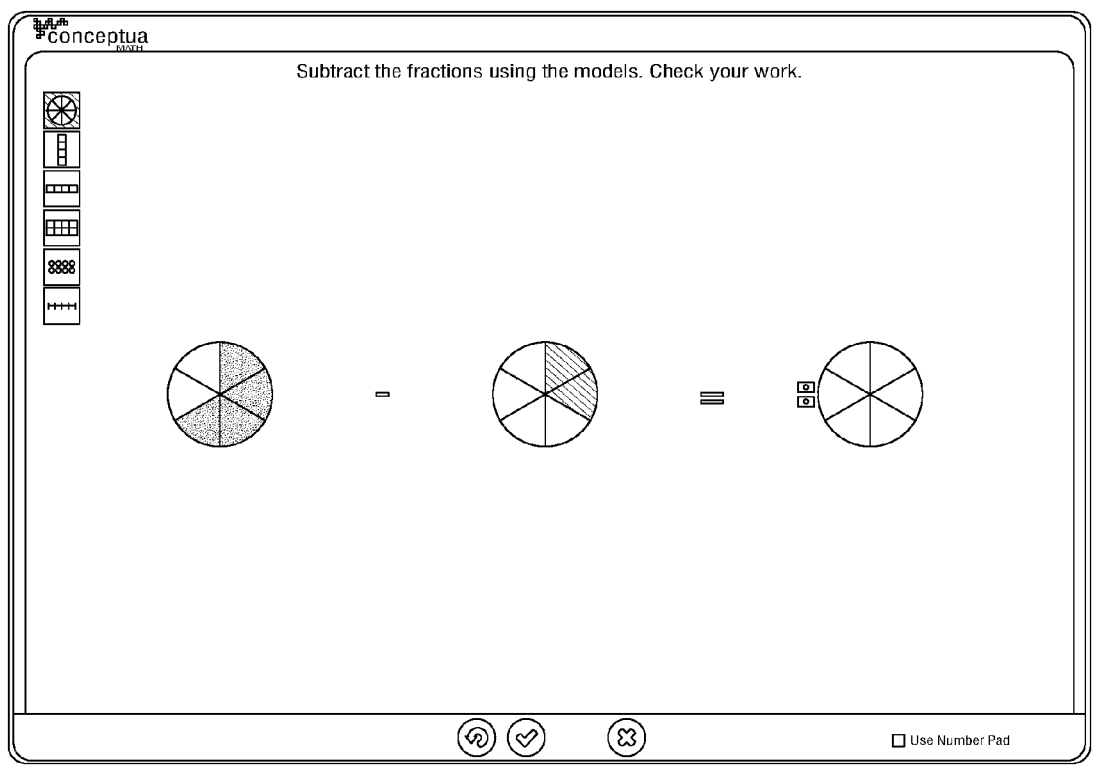
FIG. 20 is an example screen shot for subtracting the fractions using models, according to an embodiment.

FIG. 20 shows Step 2, for a different problem, a different model (pie circle) is selected. The pie circle icon is highlighted because it is selected.

FIG. 21 shows Step 3, the student creates the entire fraction in the difference.

FIG. 21 shows a problem using the vertical bar model. In the example, both the numerator and the denominator of the difference model are unlocked. Thus, the student must build the answer in the difference model from scratch.

Figure 22:
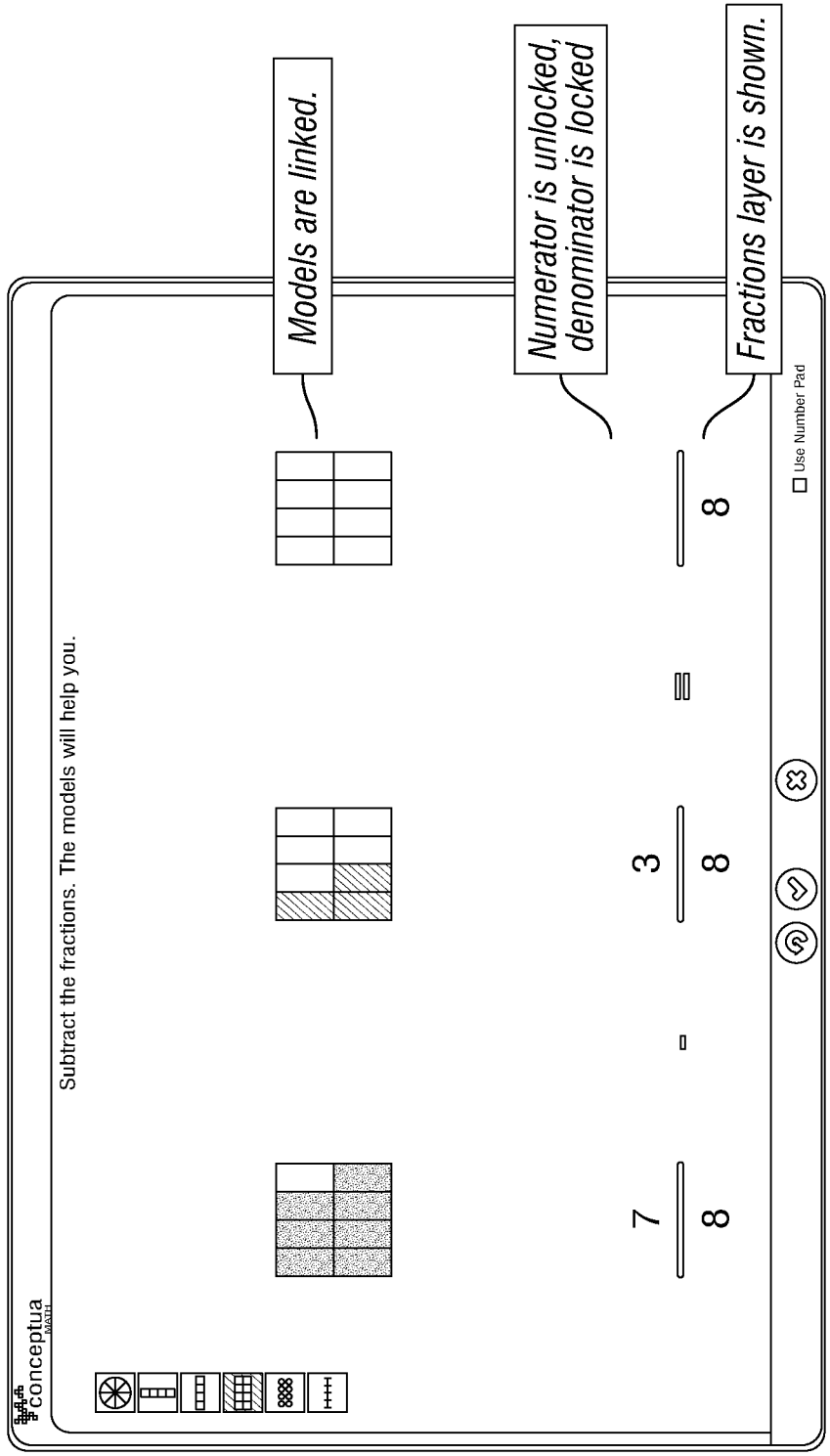
FIG. 22 is an example screen shot showing subtracting the fractions where the models and the fraction layer are linked, and in the fraction layer, the numerator in the difference is unlocked and the denominator is locked, according to an embodiment.

FIG. 22 shows Step 4, numbers are introduced and the student provides the numerator of the difference model. FIG. 22 shows linked rectangle models and fractions. However, the numerator in the difference fraction is unlocked while its denominator is locked. Thus, the student may either fill in the model or type in the correct number in the fraction to solve the problem.

FIG. 23 shows Step 5, strategically changing the model to promote flexibility. FIG. 23 shows the discrete model icon is selected. Thus, discrete models are shown and the fractions layer is also shown.

Figure 24:
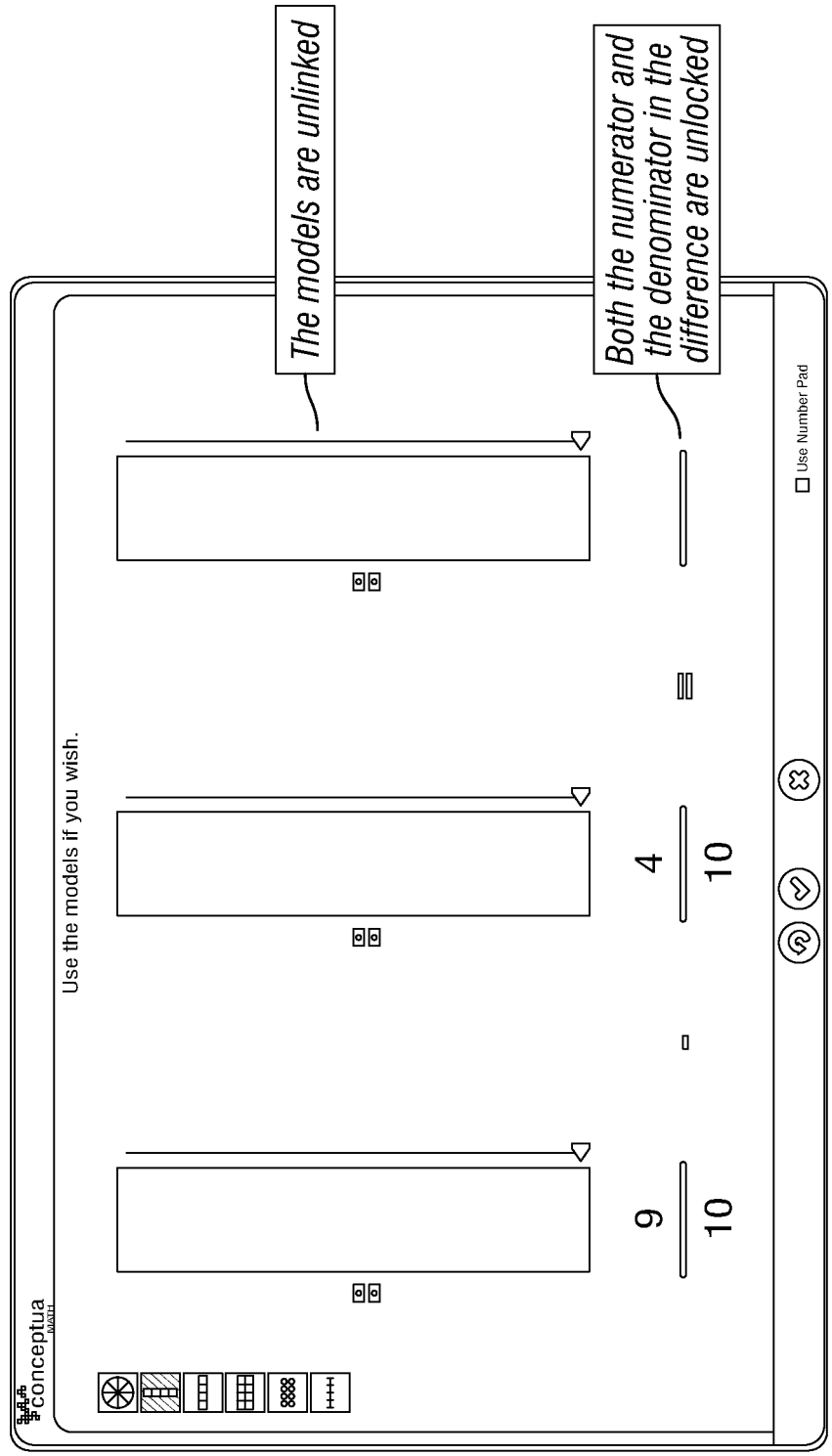
FIG. 24 is an example screen shot showing unlinked models and unlocked numerator and denominator in the difference fraction, according to an embodiment.

FIG. 24 shows Step 6, the student provides the numerator and the denominator. FIG. 24 shows that the vertical bar icon is selected. The vertical bar models are shown and the fractions layer is shown. In this particular example, the models are unlinked to the fractions. As well, both the numerator and the denominator in the difference model are unlocked. Such example shows the increasing sophistication and learning that has taken place by the student, because the student presumably wants to solve the problem using fractions only and not the models, which may be presented for support.

Figure 25:
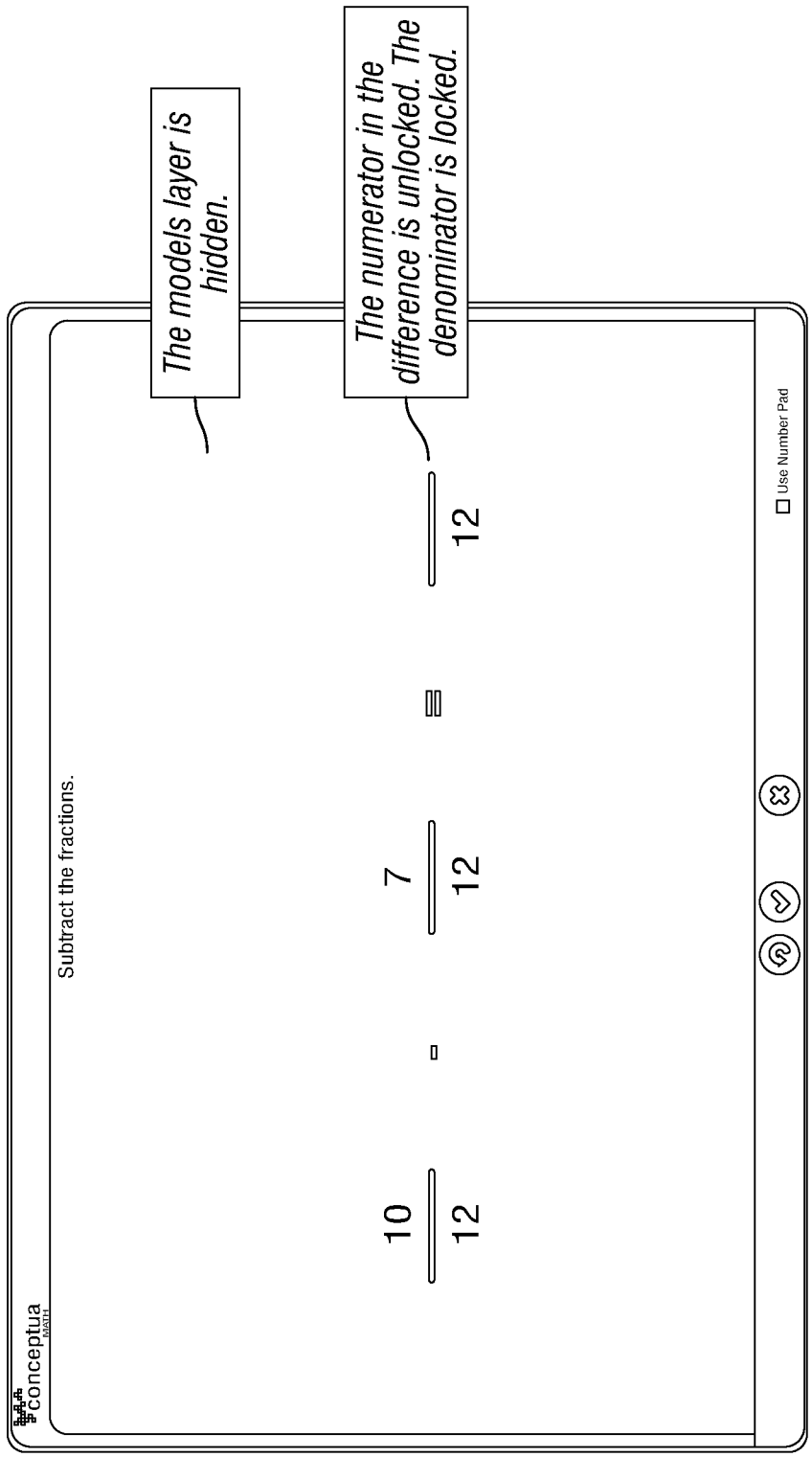
FIG. 25 is an example screen shot where the model layer is hidden and in the difference fraction, the numerator is unlocked and the denominator is locked, according to an embodiment.

FIG. 25 shows Step 7, procedures only, the student calculates the numerator. FIG. 25 shows the models layer is hidden. In this embodiment, the set of models icons is also hidden. In the difference model, the numerator is unlocked and the denominator is locked.

FIG. 26 shows Step 8, the student is independently completing the equation. FIG. 26 shows the models layer is hidden. In this embodiment, the set of models icons is also hidden. In the difference model, both the numerator and the denominator are unlocked. This is the final step in the sequence of visual concepts to procedures.

Alternative Implementations

It should be appreciated that, among other areas of mathematics, alternative implementations are provided. Exemplary implementations for whole numbers and for decimals and percents are provided hereinbelow.

Whole Numbers

Provided below are particular models and tools used for teaching and learning whole numbers, according to an embodiment.

Models
  Sets
  Rods
  Two dimensional arrays
  ten frames
  Place value blocks
  number line
  hundreds chart
Tools
  Number identification
  Counting
  Compose (Combine) and Decompose (separate)
  Counting on/Counting back/Skip Counting
  Comparison/Ordering
  Number line
  Automaticity
  Word problems in 4 operations
  Place value and Rounding
  Addition to 20
  Addition Fact Families (5+7=12, 7+5=12, 12−5=7, 12−7=5)
  Place value addition (expanded notation)
  Subtraction under 20
  Place value subtraction (expanded notation)
  Primes, Factors, Multiples, Least Common Multiple
  Multiplication within 100 (number line & arrays)
  Multiplication Fact families (5*7=35, 7*5=35, 35/5=7, 35/7=5)
  Place value multiplication
  Factors and multiples, Even/Odd, Prime and composite numbers
  Division within 100
  Place value Division (long division)

Decimals and Percents

Provided below are particular models and tools used for teaching and learning decimals and percents, according to an embodiment.

Models
  decimal chart
  decimal blocks
  numberline
  all models in the Fractions product
Tools
  Identifying, writing decimals
  Composition, Decomposition
  Comparison, Sorting
  Number line
  Correspondence to fractions, fractions as division
  Rounding
  Addition
  Subtraction

An Example Machine Overview

Figure 30:
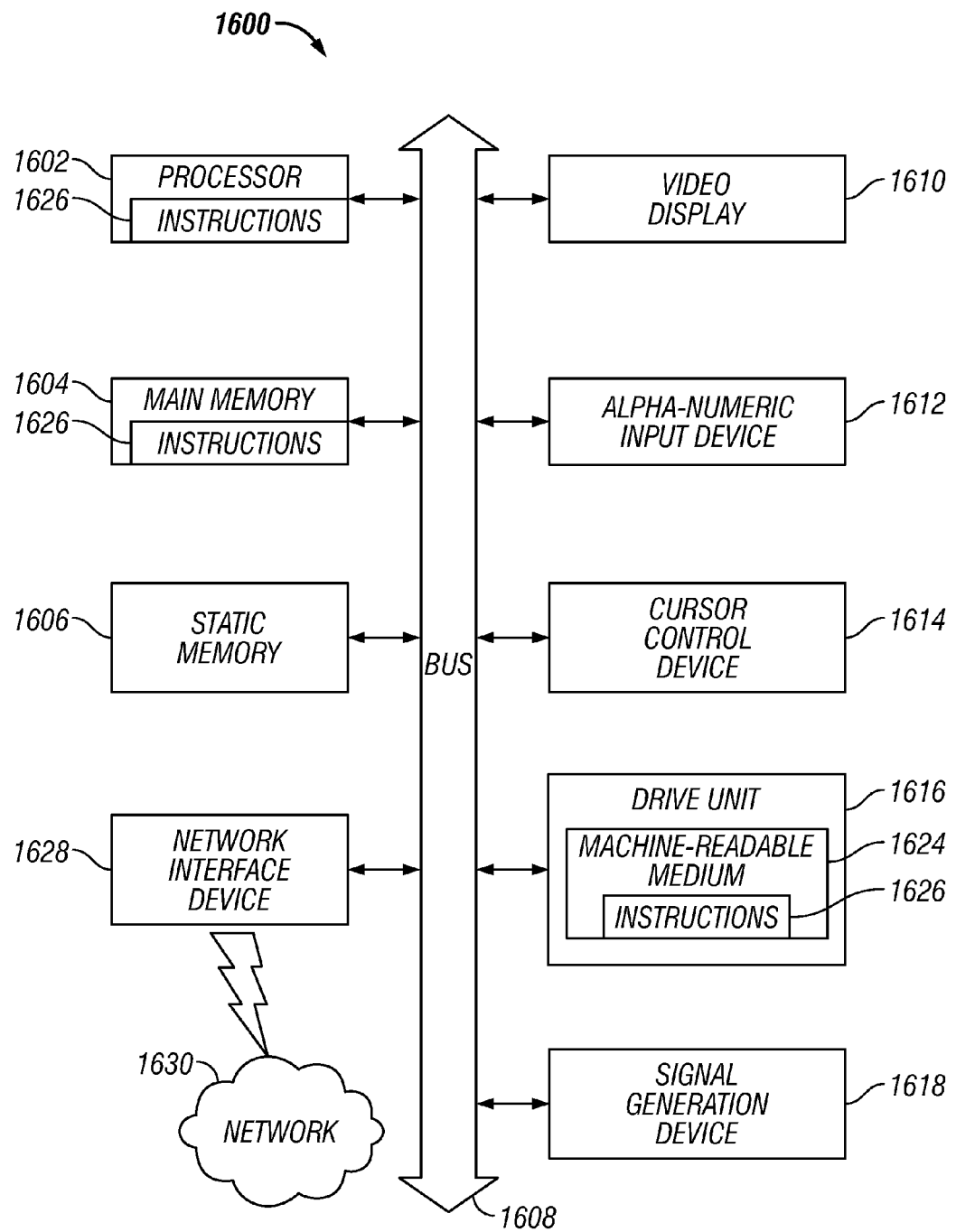
FIG. 30 is a block schematic diagram of a system in the exemplary form of a computer system, according to an embodiment.

FIG. 30 is a block schematic diagram of a system in the exemplary form of a computer system 1600 within which a set of instructions for causing the system to perform any one of the foregoing methodologies may be executed. In alternative embodiments, the system may comprise a network router, a network switch, a network bridge, personal digital assistant (PDA), a cellular telephone, a Web appliance or any system capable of executing a sequence of instructions that specify actions to be taken by that system.

The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1628.

The disk drive unit 1616 includes a machine-readable medium 1624 on which is stored a set of executable instructions, i.e. software, 1626 embodying any one, or all, of the methodologies described herein below. The software 1626 is also shown to reside, completely or at least partially, within the main memory 1604 and/or within the processor 1602. The software 1626 may further be transmitted or received over a network 1628, 1630 by means of a network interface device 1628.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complimentary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a system or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A system for facilitating a user to progress from visual concepts to procedures, said system comprising:
   a memory; and
   at least one processor programmed to perform the steps of:
      providing a first step, said first step comprising presenting models only wherein the denominator of a resulting model of the presented models is locked;
      providing a second step, said second step comprising allowing a user to change the type of the models presented;
      providing a third step, said third step comprising allowing a user to create an entire fraction in the resulting model;
      providing a fourth step, said fourth step comprising introducing numbers and requiring the user to provide a numerator in the resulting model;
      providing a fifth step, said fifth step comprising allowing the user to strategically change the model to promote flexibility;
      providing a sixth step, said sixth step comprising requiring the user provide the numerator and the denominator;
      providing a seventh step, said seventh step comprising presenting procedures only and requiring the user to calculate the numerator; and
      providing an eighth step, said eighth step comprising requiring the user to calculate the numerator and input the denominator.

* * * * *